(12) United States Patent
Fan et al.

(10) Patent No.: US 12,506,509 B2
(45) Date of Patent: Dec. 23, 2025

(54) SIGNAL ANTI-INTERFERENCE METHOD AND ELECTRONIC DEVICE

(71) Applicant: Honor Device Co., Ltd., Shenzhen (CN)

(72) Inventors: Jun Fan, Shenzhen (CN); Ming Yin, Shenzhen (CN); Kaixiang Zhu, Shenzhen (CN); Keyu Si, Shenzhen (CN); Dong Wu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 16 days.

(21) Appl. No.: 18/695,560

(22) PCT Filed: Jun. 12, 2023

(86) PCT No.: PCT/CN2023/099629
§ 371 (c)(1),
(2) Date: Mar. 26, 2024

(87) PCT Pub. No.: WO2024/169091
PCT Pub. Date: Aug. 22, 2024

(65) Prior Publication Data
US 2025/0167825 A1 May 22, 2025

(30) Foreign Application Priority Data
Feb. 16, 2023 (CN) .......................... 202310124628.1

(51) Int. Cl.
*H04B 1/525* (2015.01)
*H04B 1/12* (2006.01)
(52) U.S. Cl.
CPC .............. *H04B 1/525* (2013.01); *H04B 1/123* (2013.01)

(58) Field of Classification Search
CPC ........... H04B 1/525; H04B 1/123; H04B 1/40
See application file for complete search history.

(56) References Cited

U.S. PATENT DOCUMENTS

| | | | | | |
|---|---|---|---|---|---|
| 5,337,198 | A | * | 8/1994 | Nishiyama | ............... G11B 5/09 |
| 10,673,474 | B2 | * | 6/2020 | Ji | ........................ H04B 15/02 |

(Continued)

FOREIGN PATENT DOCUMENTS

| | | | | | |
|---|---|---|---|---|---|
| CN | 1138784 | A | * | 12/1996 | ............. H04B 1/707 |
| CN | 1312624 | A | * | 9/2001 | ........... H04B 1/7115 |

(Continued)

*Primary Examiner* — Berhanu Tadese
(74) *Attorney, Agent, or Firm* — Leydig, Voit & Mayer, Ltd.

(57) ABSTRACT

This application discloses a signal anti-interference method and an electronic device, and relates to the field of terminals. A system-on-chip (SoC) chip may obtain parameter information (for example, an amplitude of a radio frequency signal, a phase of the radio frequency signal, a waveform of the radio frequency signal and the like) of the radio frequency signal coupled on a mobile industry processor interface (MIPI) signal line. Based on the parameter information of the radio frequency signal, the SoC chip may generate a reverse signal of the radio frequency signal, where the reverse signal is the same as the radio frequency signal in amplitudes (which may also be referred to as amplitude values) and waveforms and opposite in phases. The SoC chip may superimpose the reverse signal with a signal transmitted by the MIPI signal line, to eliminate the radio frequency signal coupled on the MIPI signal line.

16 Claims, 8 Drawing Sheets

(56) References Cited

U.S. PATENT DOCUMENTS

| | | | | |
|---|---|---|---|---|
| 2007/0236620 A1* | 10/2007 | Yan | ............... | G02F 1/136286 |
| | | | | 349/56 |
| 2014/0287795 A1* | 9/2014 | Lee | ............... | H04L 7/0008 |
| | | | | 455/550.1 |
| 2020/0233821 A1* | 7/2020 | Kumar | ............... | G06F 13/20 |
| 2025/0167825 A1* | 5/2025 | Fan | ............... | H04B 1/525 |

FOREIGN PATENT DOCUMENTS

| | | | | |
|---|---|---|---|---|
| CN | 1349689 A | * | 5/2002 | ............ G01M 5/0025 |
| CN | 1493123 A | * | 4/2004 | ............ H04J 13/0003 |
| CN | 2661525 Y | * | 12/2004 | |
| CN | 1728457 A | * | 2/2006 | |
| CN | 1306740 C | * | 3/2007 | ............ H04J 11/003 |
| CN | 100380135 C | * | 4/2008 | |
| CN | 201509198 U | * | 6/2010 | |
| CN | 102280310 A | * | 12/2011 | |
| CN | 202111671 U | * | 1/2012 | |
| CN | 202126968 U | * | 1/2012 | |
| CN | 102393538 A | * | 3/2012 | |
| CN | 202196184 U | * | 4/2012 | |
| CN | 101674142 B | * | 2/2013 | |
| CN | 103091685 A | * | 5/2013 | |
| CN | 102048528 B | * | 6/2013 | |
| CN | 103475343 A | * | 12/2013 | |
| CN | 203705531 U | * | 7/2014 | |
| CN | 104049262 A | * | 9/2014 | ............ G01S 19/29 |
| CN | 104219834 A | * | 12/2014 | |
| CN | 104717303 A | * | 6/2015 | ............ H04L 67/12 |
| CN | 103368590 B | * | 10/2015 | |
| CN | 105137114 A | * | 12/2015 | |
| CN | 103475343 B | * | 1/2016 | |
| CN | 205212812 U | * | 5/2016 | |
| CN | 105655709 A | * | 6/2016 | ............ H01Q 21/00 |
| CN | 105790746 A | * | 7/2016 | ............ H04B 10/25 |
| CN | 105959246 A | * | 9/2016 | ............ H04W 16/10 |
| CN | 104219834 B | * | 10/2016 | |
| CN | 106209719 A | * | 12/2016 | ......... H04L 27/2656 |
| CN | 106230446 A | * | 12/2016 | ............ H04B 1/10 |
| CN | 205791785 U | * | 12/2016 | |
| CN | 104049262 B | * | 1/2017 | ............ G01S 19/29 |
| CN | 106301581 A | * | 1/2017 | ............ H04B 10/297 |
| CN | 107135037 A | * | 9/2017 | ............ H04B 15/02 |
| CN | 107276599 A | * | 10/2017 | ............ H04B 1/0475 |
| CN | 107276602 A | * | 10/2017 | ............ G06F 1/1698 |
| CN | 107733547 A | * | 2/2018 | ............ H04B 1/69 |
| CN | 107953840 A | * | 4/2018 | ............ B60T 7/12 |
| CN | 108199802 A | * | 6/2018 | ............ H04K 3/84 |
| CN | 108234376 A | * | 6/2018 | ......... H04L 27/2663 |
| CN | 108259066 A | * | 7/2018 | ......... H04B 10/2589 |
| CN | 108346392 A | * | 7/2018 | ............ G09G 3/006 |
| CN | 105323203 B | * | 8/2018 | ............ H04L 27/32 |
| CN | 108365863 A | * | 8/2018 | ............ H04B 15/00 |
| CN | 105655709 B | * | 10/2018 | ............ H01Q 21/00 |
| CN | 108768441 A | * | 11/2018 | ............ H04B 1/525 |
| CN | 108834159 A | * | 11/2018 | ........ H04W 36/0083 |
| CN | 107953840 B | * | 1/2019 | ......... B60R 16/0232 |
| CN | 109257055 A | * | 1/2019 | ............ H04B 1/126 |
| CN | 109412641 A | * | 3/2019 | ............ H04L 27/22 |
| CN | 109547646 A | * | 3/2019 | ......... H04W 52/146 |
| CN | 106230446 B | * | 4/2019 | ............ H04B 1/10 |
| CN | 107276602 B | * | 6/2019 | ............ H04B 17/318 |
| CN | 107773303 B | * | 6/2019 | ............ A61B 18/16 |
| CN | 209018932 U | * | 6/2019 | |
| CN | 108259066 B | * | 7/2019 | ......... H04B 10/2589 |
| CN | 104717303 B | * | 8/2019 | ............ H04B 1/04 |
| CN | 110324065 A | * | 10/2019 | ............ H04B 1/7097 |
| CN | 110518923 A | * | 11/2019 | ............ H04B 1/16 |
| CN | 209676213 U | * | 11/2019 | |
| CN | 110783777 A | * | 2/2020 | ............ H01R 13/66 |
| CN | 108964683 B | * | 3/2020 | ............ H04B 1/40 |
| CN | 110943775 A | * | 3/2020 | ............ H04B 10/071 |
| CN | 111130577 A | * | 5/2020 | ............ H03F 1/42 |
| CN | 111445943 A | * | 7/2020 | ............ G11C 17/18 |
| CN | 111600660 A | * | 8/2020 | ............ H04B 10/693 |
| CN | 109547646 B | * | 9/2020 | ......... H04M 1/72454 |
| CN | 111934696 A | * | 11/2020 | ............ H04B 1/04 |
| CN | 108023549 B | * | 12/2020 | ............ H03F 3/45071 |
| CN | 112260705 A | * | 1/2021 | ............ H04B 1/1027 |
| CN | 212311784 U | * | 1/2021 | |
| CN | 112543033 A | * | 3/2021 | ............ H04B 1/10 |
| CN | 107276599 B | * | 5/2021 | ............ H04B 15/02 |
| CN | 112865874 A | * | 5/2021 | ............ H04B 10/85 |
| CN | 110518923 B | * | 6/2021 | ............ H04B 1/16 |
| CN | 108377171 B | * | 7/2021 | ............ H04B 17/17 |
| CN | 111130577 B | * | 7/2021 | ............ H03F 1/3211 |
| CN | 113114600 A | * | 7/2021 | ............ H04L 27/001 |
| CN | 111600660 B | * | 8/2021 | ............ H04B 10/693 |
| CN | 214314543 U | * | 9/2021 | |
| CN | 113810543 A | * | 12/2021 | ............ H04M 1/0264 |
| CN | 113992222 A | * | 1/2022 | ............ H04W 4/06 |
| CN | 110401168 B | * | 2/2022 | ............ H02H 3/08 |
| CN | 110783777 B | * | 2/2022 | ............ H01R 13/66 |
| CN | 111445943 B | * | 2/2022 | ............ G11C 17/16 |
| CN | 111130685 B | * | 4/2022 | ............ H04K 3/45 |
| CN | 113992222 B | * | 4/2022 | ............ H04W 4/80 |
| CN | 114264895 A | * | 4/2022 | ............ H04W 52/26 |
| CN | 112865874 B | * | 7/2022 | ............ H04B 10/85 |
| CN | 112543033 B | * | 12/2022 | ............ H04B 1/10 |
| CN | 115494455 A | | 12/2022 | |
| CN | 115498986 A | * | 12/2022 | ............ H03K 5/133 |
| CN | 115549788 A | * | 12/2022 | ............ G08C 23/06 |
| CN | 115833870 A | * | 3/2023 | ............ H04B 1/123 |
| CN | 112803899 B | * | 10/2023 | ............ H03F 1/26 |
| CN | 115885478 B | * | 1/2025 | ............ H04L 1/00 |
| CN | 112311383 B | * | 3/2025 | ............ G01R 31/40 |
| JP | 6735949 B1 | * | 8/2020 | ............ H04L 27/26 |
| TW | M526791 U | * | 8/2016 | |
| TW | 201702626 A | * | 1/2017 | |
| TW | I576601 B | * | 4/2017 | |
| WO | WO-2005015786 A1 | * | 2/2005 | ......... H04B 10/5561 |
| WO | WO-2011020295 A1 | * | 2/2011 | ......... H04J 11/0036 |
| WO | WO-2016115745 A1 | * | 7/2016 | ............ H04M 1/02 |
| WO | WO-2021254131 A1 | * | 12/2021 | ............ G06F 1/3203 |
| WO | WO-2022011574 A1 | * | 1/2022 | ............ H04L 1/1819 |
| WO | WO-2022041031 A1 | * | 3/2022 | ............ H03M 13/11 |
| WO | WO-2022100515 A1 | * | 5/2022 | ............ H04L 1/1671 |
| WO | WO-2022160960 A1 | * | 8/2022 | ............ H01B 11/06 |

* cited by examiner

SIGNAL ANTI-INTERFERENCE METHOD AND ELECTRONIC DEVICE

CROSS-REFERENCE TO RELATED APPLICATIONS

This application is a national stage of International Application No. PCT/CN2023/099629, filed on Jun. 12, 2023, which claims priority to Chinese Patent Application No. 202310124628.1, filed on Feb. 16, 2023. The disclosures of both of the aforementioned applications are hereby incorporated by reference in their entireties.

TECHNICAL FIELD

This application relates to the field of terminal devices, and in particular, to a signal anti-interference method and an electronic device.

BACKGROUND

As terminal technologies develop, functions of electronic devices have expanded significantly. Users have increasingly embraced electronic devices for various daily tasks such as photo shooting, calling, and web browsing. However, radio frequency signals emitted by a radio frequency module used for the electronic device to communicate with other devices (such as a base station) tend to interfere with mobile industry processor interface (MIPI) signals used by multi-media modules (including a camera module and a display module) to transmit data to a processor in the electronic device. Such interference leads to a degradation in transmission quality of the MIPI signal, which can result in stuttering as well as distortion or artifacts in displayed content. Therefore, finding solutions to mitigate radio frequency signal interference on the MIPI signal has become an urgent problem.

SUMMARY

This application provides a signal anti-interference method and an electronic device, to eliminate a radio frequency signal based on a reverse signal of the radio frequency signal without additional occupation of an internal architecture space of an electronic device, so as to reduce impact on a volume and a weight of the electronic device, save manufacturing costs of the electronic device, improve noise reduction efficiency, and significantly improve transmission quality of a MIPI signal.

According to a first aspect, this application provides a signal anti-interference method, applied to an electronic device including a SoC chip, a first information processing module, and a radio frequency module. The SoC chip and the first information processing module are connected through a plurality of signal lines, the plurality of signal lines include a first signal line and a second signal line, and the method includes: The electronic device transmits a radio frequency signal through the radio frequency module. The first information processing module on the electronic device sends a first processing signal through the first signal line. The electronic device obtains a detection signal from the second signal line, where the detection signal is a radio frequency signal that is all or partially coupled on the second signal line. The electronic device receives the first processing signal from the first signal line through the SoC chip, where the first processing signal includes a second processing signal and a first radio frequency signal, and the first radio frequency signal is a radio frequency signal on the first signal line. The electronic device determines a first signal based on the detection signal, where waveform information of the first signal is the same as waveform information of the first radio frequency signal, an amplitude value of the first signal is the same as an amplitude value of the first radio frequency signal, and a phase of the first signal differs 180 degrees from a phase of the first radio frequency signal. The electronic device eliminates the first radio frequency signal in the first processing signal based on the first signal, to obtain the second processing signal.

In a possible implementation, the first information processing module includes one or more of the following: a display device, an audio device, and a camera device. The radio frequency module includes a radio frequency path and a baseband processor Modem.

In a possible implementation, the plurality of signal lines further includes a third signal line. The method further includes: The electronic device obtains a first difference value between an amplitude value of a radio frequency signal on the third signal line and an amplitude value of a radio frequency signal on the first signal line, and obtaining a second difference value between a phase of the radio frequency signal on the third signal line and a phase of the radio frequency signal on the first signal line. The electronic device determines a second signal based on the first signal, the first difference value, and the second difference value. The electronic device eliminates the radio frequency signal on the third signal line based on the second signal.

In a possible implementation, that the electronic device determines a second signal based on the first signal, the first difference value, and the second difference value specifically includes: The electronic device superimposes an amplitude value of the first signal with the first difference value to obtain an amplitude value of the second signal. The electronic device superimposes a phase of the first signal with the second difference value to obtain a phase of the second signal. The electronic device determines waveform information of the second signal based on waveform information of the first signal, where waveform information of the second signal is the same as waveform information of the first signal. The electronic device determines the second signal based on the amplitude value of the second signal, the phase of the second signal, and the waveform information of the second signal.

In a possible implementation, the first signal and the second signal are the same, or the first signal and the second signal are different.

In a possible implementation, that the electronic device obtains a detection signal from the second signal line, where the detection signal is a radio frequency signal that is all or partially coupled on the second signal line specifically includes: The electronic device obtains the detection signal by using a coupler on the second signal line, where the detection signal is the radio frequency signal that is all or partially coupled on the second signal line.

In a possible implementation, the plurality of signal lines are the following: a plurality of mobile industry processor interface MIPI signal lines, a plurality of integrated circuit I2C buses, or a plurality of main system clock MCLK signal lines, or general-purpose input/output GPIO signal lines.

According to a second aspect, an embodiment of this application provides an electronic device. The electronic device includes a SoC chip, a first information processing module, and a radio frequency module, the SoC chip and the first information processing module are connected through a plurality of signal lines, and the plurality of signal lines include a first signal line and a second signal line. The radio frequency module is configured to transmit a radio frequency signal. The first information processing module is configured to send a first processing signal through the first signal line. The radio frequency module is further configured to obtain a detection signal from the second signal line, where the detection signal is a radio frequency signal that is all or partially coupled on the second signal line. The SoC chip is configured to receive the first processing signal from the first signal line, where the first processing signal includes a second processing signal and a first radio frequency signal. The first radio frequency signal is a radio frequency signal on the first signal line. The radio frequency module is further configured to determine a first signal based on the detection signal, where waveform information of the first signal is the same as waveform information of the first radio frequency signal, an amplitude value of the first signal is the same as an amplitude value of the first radio frequency signal, and a phase of the first signal differs 180 degrees from a phase of the first radio frequency signal. The SoC chip is further configured to eliminate the first radio frequency signal in the first processing signal based on the first signal, to obtain the second processing signal.

In a possible implementation, the first information processing module includes one or more of the following: a display device, an audio device, and a camera device. The radio frequency module includes a radio frequency path and a baseband processor Modem.

According to a third aspect, an embodiment of this application provides a chip or a chip system, including a processing circuit and an interface circuit. The interface circuit is configured to receive a code instruction and transmit the code instruction to the processing circuit, and the processing circuit is configured to run the code instruction, to enable the chip or the chip system to perform the method according to any one of the foregoing possible implementations of the first aspect.

According to a fourth aspect, an embodiment of this application provides a computer-readable storage medium, including computer instructions. When the computer instructions are run on an electronic device, the electronic device is enabled to perform the method according to any one of the foregoing possible implementations of the first aspect.

DESCRIPTION OF EMBODIMENTS

Figure 1A:
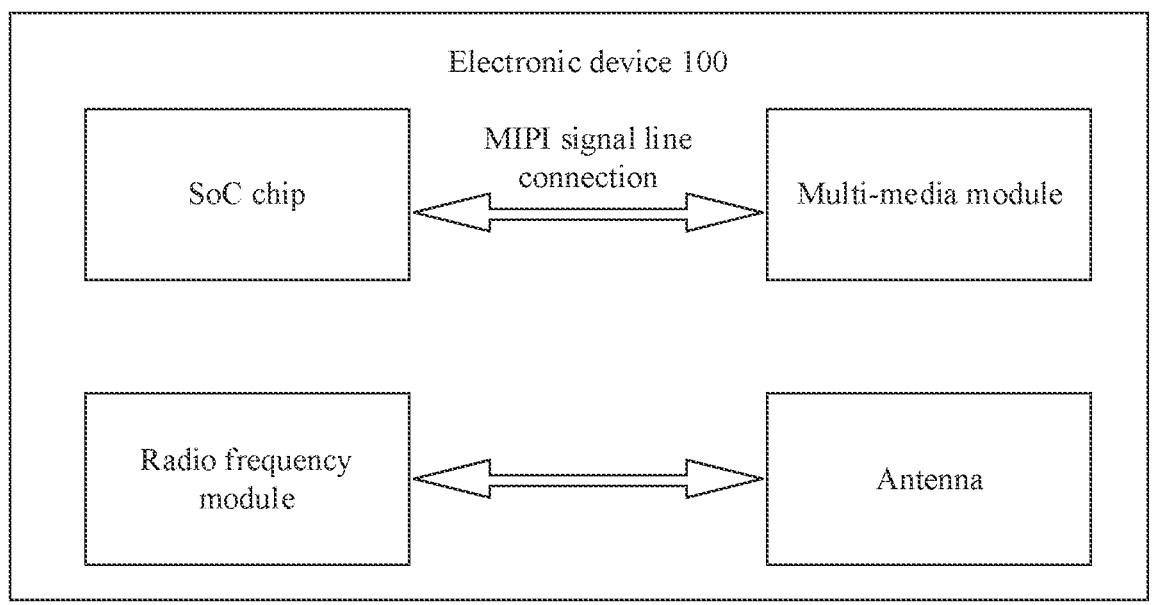
FIG. 1A is a schematic diagram of a structure of hardware modules according to an embodiment of this application.

Terms used in the following embodiments of this application are merely intended to describe specific embodiments, but are not intended to limit this application. As used in this specification of this application and the appended claims, the singular expression "a", "an", "the", "the foregoing", "such a", or "this" is intended to also include a plural expression unless otherwise clearly indicated in the context. It should be further understood that, as used in this application, the term "and/or" indicates and includes any and all possible combinations of one or more of the listed items. In embodiments of this application, terms "first" and "second" are used merely for the purpose of description, and shall not be construed as indicating relative importance or implying a quantity of indicated technical features. Therefore, a feature limited by "first" or "second" may explicitly or implicitly include one or more of the features. In the descriptions of embodiments of this application, unless otherwise specified, "a plurality of" means two or more.

First, a signal anti-interference process provided in an embodiment of this application is described.

In a hardware structure setting of an electronic device (referred to as an electronic device 100 for short in subsequent embodiments), a system chip integrated with a central processing unit (CPU), such as a system-on-chip (SoC) chip, is often used to transmit data information through a mobile industry processor interface (MIPI) signal line with a multi-media module (which may alternatively be referred to as a first information processing module). The electronic device 100 usually transmits a high-power microwave signal (for example, a global system for mobile communications GSM signal, a wireless fidelity Wi-Fi signal, or the like) through a radio frequency module, so that the electronic device 100 may communicate with another device (for example, a base station).

However, the above high-power microwave signal may be coupled on the MIPI signal line through a coupling path formed by a metal medium near the radio frequency module, or an MIPI signal transmitted on the MIPI signal line may be interfered by an electromagnetic wave in the space through coupling, affecting normal operation of the multi-media module, which may cause distortion or speckle in content displayed on a display.

The radio frequency module may include a radio frequency path and a baseband processor Modem. The multi-media module may refer to a module capable of comprehensively processing and managing a plurality of pieces of media information such as texts, data, graphics, images, animations, and sounds. The multi-media module may include one or more of the following: a display device, an audio device, a camera device, or the like. The radio frequency module may provide a mobile communication solution including 2G/3G/4G/5G applied to the electronic device 100, or may provide one or more wireless communication solutions such as a wireless local area network, a global navigation satellite system, and a frequency modulation applied to the electronic device 100. That is, the radio frequency module may include a mobile communication module and/or a wireless communication module. MIPI is an open standard and a specification made by an MIPI alliance for a mobile application processor, and standardizes an interface, such as a display, a camera, and a radio frequency interface, inside the electronic device 100. A data line connected to the MIPI interface may be referred to as an MIPI signal line. In a subsequent embodiment, a signal carrying media information transmitted at the MIPI interface or on the MIPI signal line may be referred to as an MIPI signal, and a signal modulated and transmitted by the radio frequency module may be referred to as a radio frequency signal.

Therefore, in the anti-interference process of the signal, the multi-media module in the electronic device 100 may be disposed at a position far away from the radio frequency module, or a grounding measure/signal shielding measure may be set between the multi-media module and the radio frequency module to reduce coupling between the MIPI signal and the radio frequency signal, so as to reduce interference of the radio frequency signal on the MIPI signal. It can be seen from the foregoing signal anti-interference process, when the multi-media module is arranged at a position far away from the radio frequency module or the grounding measure/signal shielding measure is set between the multi-media module and the radio frequency module, the anti-interference performance of the MIPI signal is optimized from the hardware level, internal architecture space of the electronic device 100 needs to be occupied, a volume and a weight of the electronic device 100 are increased, manufacturing costs of the electronic device 100 are increased, and a significantly inconvenient use experience is brought to a user.

Therefore, this application provides a signal anti-interference method.

In the signal anti-interference method, a SoC chip may obtain parameter information (for example, an amplitude of a radio frequency signal, a phase of the radio frequency signal, a waveform of the radio frequency signal, and the like) of the radio frequency signal coupled on the MIPI signal line. Based on the parameter information of the radio frequency signal, the SoC chip may generate a reverse signal of the radio frequency signal. The reverse signal is the same as the radio frequency signal in amplitudes (which may also be referred to as amplitude values) and waveforms, and opposite in phases. The SoC chip may superimpose the reverse signal onto a signal transmitted by an MIPI signal line, to eliminate the radio frequency signal coupled on the MIPI signal line.

In some embodiments, the signal anti-interference method may also be applied to signal transmission of other signal lines such as an inter-integrated circuit (I2C) bus, a main system clock (MCLK) signal line, and a general purpose input/output (GPIO) signal line. To be specific, a radio frequency signal coupled on the signal line may be eliminated based on the signal anti-interference method provided in this application. The I2C bus, the MCLK signal line, and the GPIO signal line may be used to connect a first information processing module and the SoC chip. The first information processing module connected to the I2C bus, the MCLK signal line and the GPIO signal line may be a multi-media module, or may not be a multi-media module (for example, may be a sensor module, a system clock module, or the like), which is not limited in this application.

It can be seen from the foregoing signal anti-interference method that, in an implementation process of the method, an internal architecture space of the electronic device 100 does not need to be additionally occupied, influence on a volume and a weight of the electronic device 100 is reduced, and manufacturing costs of the electronic device 100 are reduced. In addition, the radio frequency signal is eliminated based on the reverse signal of the radio frequency signal, noise reduction efficiency can be improved, and transmission quality of the MIPI signal is greatly improved.

The following describes a signal anti-interference method according to an embodiment of this application.

A signal anti-interference method according to an embodiment of this application is described with reference to FIG. 1A to FIG. 1B. FIG. 1A is a schematic diagram of a structure of hardware modules, and FIG. 1B is a schematic diagram of a specific procedure of the signal anti-interference method.

As shown in FIG. 1A, the hardware module structure may include the following: a SoC chip, a multi-media module, a radio frequency module, and an antenna. The radio frequency module may include a Modem module (not shown in FIG. 1A) and a radio frequency path (not shown in FIG. 1A). The SoC chip may be connected to the multi-media module through an MIPI signal line, the SoC chip may be connected to the radio frequency module through a data line (not shown in FIG. 1A), the radio frequency module may be connected to the antenna, and the antenna may be configured to transmit an electromagnetic wave signal modulated by the radio frequency module, or may be configured to receive an electromagnetic wave signal. The SoC chip may perform mutual transmission of data information with the radio frequency module based on digital information that includes binary digital codes. The multi-media module may include one or more multi-media devices, for example, a display device, an audio device, and/or a camera device.

Figure 1B:
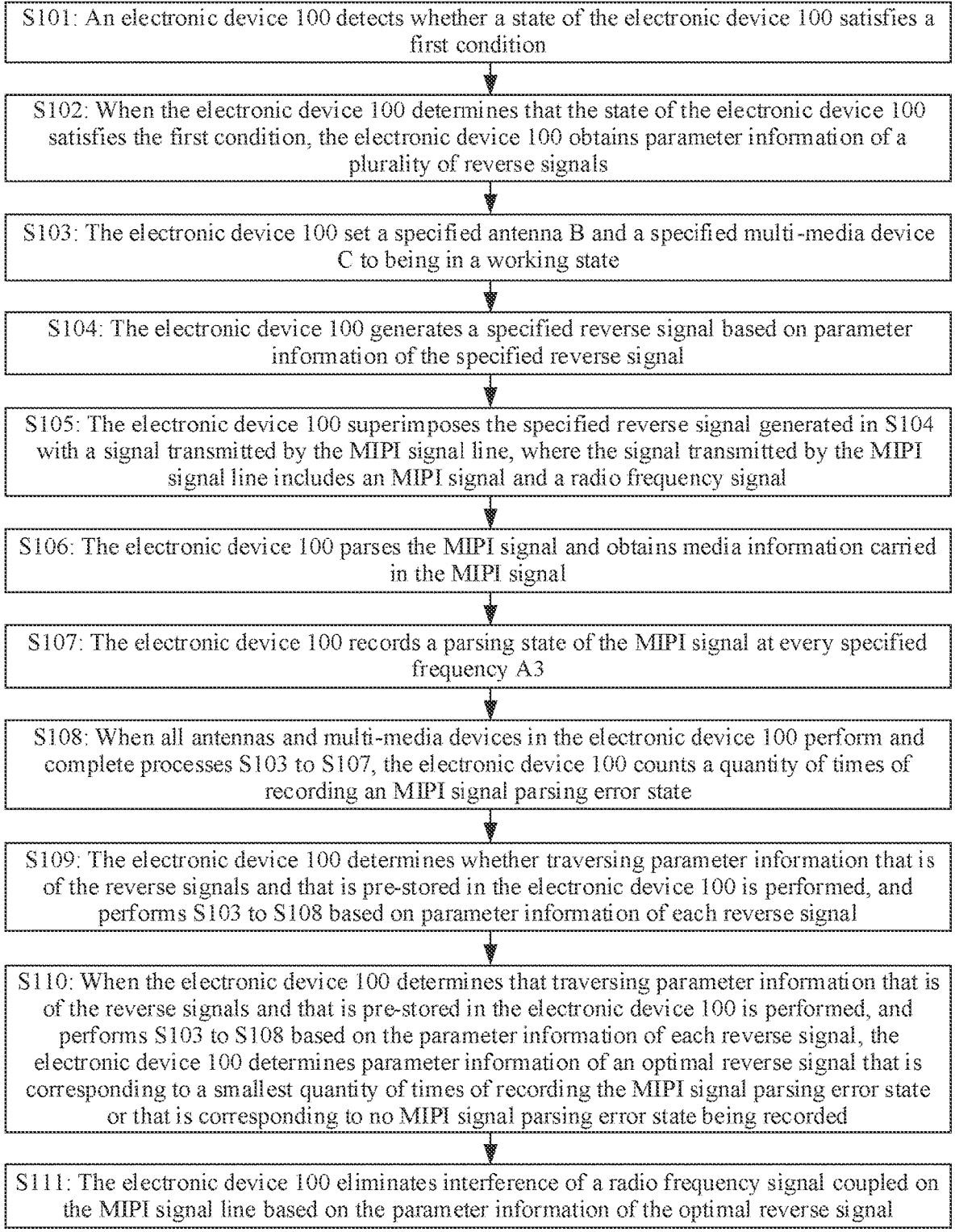
FIG. 1B is a schematic diagram of a specific procedure of a signal anti-interference method according to an embodiment of this application.

As shown in FIG. 1B, a specific flow of the signal anti-interference method may include the following steps.

S101: The electronic device 100 detects whether a state of the electronic device 100 satisfies a first condition.

The first condition may include one or more of the following:

(A) A first instruction is received. For example, in a possible implementation, the electronic device 100 may receive a first instruction before leaving the factory, or the electronic device 100 may receive a first instruction after disassembly repairing is performed. In another possible implementation, the electronic device 100 may display a first control on a display. When the electronic device 100 receives a touch operation (for example, tapping, long pressing, or the like) acting on a first control, in response to the touch operation, the electronic device 100 performs a subsequent process. In this case, the touch operation acting on the first control is the first instruction.

(B) The electronic device 100 is subjected to violent vibration or shaking. For example, the electronic device 100 may detect whether the electronic device 100 is violently subjected to violent vibration or shaking based on an acceleration sensor. When the acceleration sensor in the electronic device 100 detects that an acceleration value of the electronic device 100 is greater than a specified threshold A1 (for example, 5 m^2/s, or the like), the electronic device 100 may determine that the electronic device 100 is violently subjected to violent vibration or shaking. Without being limited to an acceleration sensor, in other embodiments of this application, the electronic device 100 may alternatively detect that the electronic device 100 is subjected to violent vibration or shaking in other manners, which is not limited in this application.

(C) The electronic device 100 is in a charging state. For example, the electronic device 100 may detect, based on a power management integrated circuit (IC) chip, whether the electronic device 100 is in the charging state. When the power management IC chip detects that an external power supply charges a battery in the electronic device 100 through a universal serial bus (USB) interface, the power management IC chip may enable a system (for example, an Android system) on the electronic device 100 to send a broadcast (for example, an Intent. ACTION_POWER_CONNECTED broadcast) that indicates that the electronic device 100 is in a charging state, and other modules in the electronic device 100 may receive the broadcast to determine that the electronic device 100 is in a charging state. Not limited to the foregoing method, in other embodiments of this application, the electronic device 100 may detect that the electronic device 100 is in the charging state in other manners, which is not limited in this application.

Specifically, when the electronic device 100 determines that the state of the electronic device 100 satisfies the first condition, the electronic device 100 may perform the following procedure. When the electronic device 100 determines that the state of the electronic device 100 does not satisfy the first condition, the electronic device 100 does not perform the following procedure, but continues to detect whether the state of the electronic device 100 satisfies the first condition until the electronic device 100 detects that the state of the electronic device 100 satisfies the first condition, the electronic device 100 performs the following procedure.

S102: When the electronic device 100 determines that the state of the electronic device 100 satisfies the first condition, the electronic device 100 obtains parameter information of a plurality of reverse signals.

The parameter information of the reverse signal includes one or more of the following: a phase of the reverse signal, an amplitude value of the reverse signal, waveform information of the reverse signal (which may also be referred to as a waveform of the reverse signal for short, which includes a waveform file of the reverse signal, and a waveform mentioned below means waveform information). The parameter information of the reverse signal may be pre-stored in the electronic device 100. The parameter information of the reverse signal may be obtained by the following method.

(1) The waveform of the reverse signal is a waveform of a radio frequency signal coupled on the MIPI signal line. When the radio frequency module in the electronic device 100 and/or the antenna connected to the radio frequency module is in a working state, the radio frequency module in the electronic device 100 may obtain the waveform of the radio frequency signal. Then, the radio frequency module in the electronic device 100 may send the obtained waveform of the radio frequency signal to the SoC chip. In some other implementations, the electronic device 100 may obtain the waveform of the reverse signal through other methods, which is not limited in this application.

(2) The amplitude value of the reverse signal may be an amplitude value of the radio frequency signal coupled on the MIPI signal line. The amplitude value of the reverse signal may alternatively be greater than or less than the amplitude value of the radio frequency signal coupled on the MIPI signal line, and a difference between the amplitude value of the reverse signal and the amplitude value of the radio frequency signal is less than or equal to a specified value B1 (for example, 0.3, 0.5, 0.7, or the like). The electronic device 100 may obtain the amplitude value of the radio frequency signal coupled on the MIPI signal line through signal simulation and/or actual measurement before the electronic device 100 leaves the factory. In some other implementations, the electronic device 100 may alternatively obtain the amplitude value of the reverse signal by other methods, which is not limited in this application.

(3) The phase of the reverse signal may be a preset phase value. For example, the phase of the reverse signal may be preset to 0 degree, 30 degrees, 60 degrees, 90 degrees, 120 degrees, 150 degrees, 180 degrees, or the like. In some other implementations, the phase of the reverse signal may include other preset phase values, which is not limited in this application.

It can be learned from the foregoing description that different reverse signal parameter information may correspond to different reverse signals, and the electronic device 100 may store different reverse signal parameter information based on a form of a table. It may be understood that the electronic device 100 may alternatively store different reverse signal parameter information based on other forms, which is not limited in this application.

For example, in a possible implementation, when the amplitude values of all the reverse signals are the same, and the amplitude value of the reverse signal is A1 millivolts (mV), that is, the amplitude value of the radio frequency signal coupled on the MIPI signal line, the reverse signal parameter information and a corresponding reverse signal may be as shown in Table 1 below:

TABLE 1

| Corresponding reverse signal | Amplitude value of the reverse signal | Phase of the reverse signal |
| --- | --- | --- |
| Reverse signal 1 | A1 mV | 0 degree |
| Reverse signal 2 | A1 mV | 30 degrees |
| Reverse signal 3 | A1 mV | 60 degrees |
| Reverse signal 4 | A1 mV | 90 degrees |
| Reverse signal 5 | A1 mV | 120 degrees |
| Reverse signal 6 | A1 mV | 150 degrees |
| Reverse signal 7 | A1 mV | 180 degrees |
| Corresponding reverse signal | Amplitude value of the reverse signal | Phase of the reverse signal |

It can be seen from Table 1 that, in this possible implementation, an amplitude value of the reverse signal 1 is A1 mV, and a phase of the reverse signal 1 is 0 degree; an amplitude value of the reverse signal 2 is A1 mV, and a phase of the reverse signal 2 is 30 degrees; an amplitude value of the reverse signal 3 is A1 mV, and a phase of the reverse signal 3 is 60 degrees; an amplitude value of the reverse signal 4 is A1 mV, and a phase of the reverse signal 4 is 90 degrees; an amplitude value of the reverse signal 5 is A1 mV, and a phase of the reverse signal 5 is 120 degrees; an amplitude value of the reverse signal 6 is A1 mV, and a phase of the reverse signal 6 is 150 degrees; and an amplitude value of the reverse signal 7 is A1 mV, and a phase of the reverse signal 7 is 180 degrees. Table 1 may alternatively include amplitude values and phases of other reverse signals. It can be learned from Table 1 that, in this possible implementation, only phases are different between different reverse signals, and amplitude values of the reverse signals are the same, and the amplitude values are all A1 mV. It should be noted that Table 1 is merely used to explain this application by examples, and does not constitute any limitation on this application.

For example, in another possible implementation, when the amplitude values of different reverse signals may be the same or different, that is, the amplitude values of the reverse signals may include a plurality of different amplitude values, and the plurality of different amplitude values include the amplitude value A1 mV of the radio frequency signal coupled on the MIPI signal line, reverse signal parameter information and corresponding reverse signals may be as shown in Table 2 below:

TABLE 2

| Corresponding reverse signal | Amplitude value of the reverse signal | Phase of the reverse signal |
| --- | --- | --- |
| Reverse signal 1 | A1 mV | 0 degree |
| Reverse signal 2 | A1 mV | 30 degrees |
| Reverse signal 3 | A1 mV | 60 degrees |
| Reverse signal 4 | A1 mV | 90 degrees |
| Reverse signal 5 | A2 mV | 120 degrees |
| Reverse signal 6 | A2 mV | 150 degrees |
| Reverse signal 7 | A2 mV | 180 degrees |
| Corresponding reverse signal | Amplitude value of the reverse signal | Phase of the reverse signal |

It can be seen from Table 2 that, in this possible implementation, an amplitude value of the reverse signal 1 is A1 mV, and a phase of the reverse signal 1 is 0 degree; an amplitude value of the reverse signal 2 is A1 mV, and a phase of the reverse signal 2 is 30 degrees; an amplitude value of the reverse signal 3 is A1 mV, and a phase of the reverse signal 3 is 60 degrees; an amplitude value of the reverse signal 4 is A1 mV, and a phase of the reverse signal 4 is 90 degrees; an amplitude value of the reverse signal 5 is A2 mV, and a phase of the reverse signal 5 is 120 degrees; an amplitude value of the reverse signal 6 is A2 mV, and a phase of the reverse signal 6 is 150 degrees; an amplitude value of the reverse signal 7 is A2 mV, and a phase of the reverse signal 7 is 180 degrees. A2 mV may be greater than A1 mV, or may be less than A1 Mv, and a difference between A2 and A1 is less than or equal to a specified value B1. Table 2 may also include amplitude values and phases of other reverse signals. It can be learned from Table 2 that different reverse signals may be different in phase, or may be different in amplitude values, or may be different in phases and amplitude values. It should be noted that Table 2 is merely used to explain this application, and does not constitute any limitation on this application.

S103: The electronic device 100 sets a specified antenna B and a specified multi-media device C to being in a working state.

The specified antenna B may be an antenna that sends a mobile communication signal or a wireless communication signal, for example, an NR78 antenna, an LTEB41 antenna, a 5 g antenna, a Wi-Fi antenna, or the like. The specified multi-media device C may be a camera device, such as a 50-million-pixel main camera (which may also be referred to as a 50 M main camera), a 100-million-pixel main camera (which may also be referred to as a 100 M main camera), an 8-million-pixel front camera (which may also be referred to as an 8 M front camera), a 2-million-pixel macro camera, or the like. The specified multi-media device C may alternatively be a display device, such as a display. The specified multi-media device C may alternatively be another device for processing media information such as text, data, graphics, images, animation, sound and the like, which is not limited in this application.

Specifically, the electronic device transmits the radio frequency signal through the radio frequency module. The electronic device 100 may set the specified antenna B to operate based on a specified transmit power. The specified transmit power may be a maximum transmit power dl of the specified antenna B, or may be another transmit power value, which is not limited in this application. The electronic device 100 may open the specified multi-media device C, so that the specified multi-media device C is also in the working state when the specified antenna B is in the working state.

S104: The electronic device 100 generates a specified reverse signal based on parameter information of the specified reverse signal.

In a possible implementation, the baseband processor Modem of the radio frequency module in the electronic device 100 may obtain parameter information (for example, the amplitude value and the phase shown in Table 1 or Table 2) that is of a plurality of reverse signals and that is pre-stored in the electronic device 100. Then, the Modem may generate a corresponding specified reverse signal based on the parameter information of the specified reverse signal.

For example, Modem in the electronic device 100 may obtain parameter information of different reverse signals as shown in Table 2. If the parameter information of the specified reverse signal includes the following: A waveform of the reverse signal is a square wave, an amplitude value of the reverse signal is A1 dBm, and a phase of the reverse signal is 0 degree, the Modem may generate a corresponding specified reverse signal based on the parameter information of the reverse signal, that is, generate the reverse signal 1.

In a possible implementation, the Modem in the electronic device 100 may send the waveform of the radio frequency signal to the SoC chip. The SoC chip may obtain amplitude values and phases that are of a plurality of reverse signals and that are pre-stored in the electronic device 100. Then, the SoC chip may generate a corresponding specified reverse signal based on the obtained waveform of the radio frequency signal, the amplitude value and the phase of the specified reverse signal.

For example, the Modem in the electronic device 100 may send the waveform of the radio frequency signal to the SoC chip, and the waveform of the radio frequency signal may be a square wave. The SoC chip may obtain parameter information of different reverse signals as shown in Table 2. If the parameter information of the specified reverse signal includes the following: A waveform of the reverse signal is a square wave, an amplitude value of the reverse signal is A1 dBm, and a phase of the reverse signal is 0 degree, the SoC chip may generate a corresponding specified reverse signal based on the parameter information of the reverse signal, that is, generate the reverse signal 1.

S105: The electronic device 100 superimposes the specified reverse signal generated in S104 onto the signal transmitted through the MIPI signal line, where the signal transmitted through the MIPI signal line includes an MIPI signal and a radio frequency signal.

Specifically, the SoC chip in the electronic device 100 may obtain the signal transmitted through the MIPI signal line. The SoC chip may superimpose the generated specified reverse signal onto the signal transmitted through the MIPI signal line. It should be noted that the signal transmitted through the MIPI signal line may include an MIPI signal carrying media information, and a radio frequency signal coupled on the MIPI signal line. The waveform of the specified reverse signal is the same as the waveform of the radio frequency signal coupled on the MIPI signal line, and the phase of the specified reverse signal is opposite to the phase of the radio frequency signal coupled on the MIPI signal line, so that when the SoC chip superimposes the specified reverse signal with the signal transmitted through the MIPI signal line, the specified reverse signal may partially or completely eliminate the radio frequency signal coupled on the MIPI signal line, and the MIPI signal carrying media information is maintained.

It should be noted that the phase of the specified reverse signal is opposite to the phase of the radio frequency signal coupled on the MIPI signal line, which means that a phase difference between the specified reverse signal and the radio frequency signal coupled on the MIPI signal line is 180 degrees (that is, half a circle). Being opposite in phases described in subsequent embodiments is the same as the foregoing description, that is, a phase difference between two signals is 180 degrees.

S106: The electronic device 100 parses the MIPI signal to obtain the media information carried in the MIPI signal.

Specifically, after the electronic device 100 superimposes the generated specified reverse signal to the signal transmitted through the MIPI signal line in step S105, the electronic device 100 may obtain the MIPI signal from the signal transmitted through the MIPI signal line. The electronic device 100 may parse the media information (for example, image information, text information, audio information, or the like) carried in the MIPI signal from the MIPI signal based on the MIPI protocol.

S107: The electronic device 100 records a parsing state of the MIPI signal at every specified frequency A3.

The parsing state of the MIPI signal may include: an MIPI signal parsing correct state and an MIPI signal parsing error state. The MIPI signal parsing correct state may indicate that the SoC chip in the electronic device 100 parses the MIPI signal correctly, and the MIPI signal parsing error state may indicate that there is an error when the SoC chip in the electronic device 100 parses the MIPI signal.

Preferably, the electronic device 100 may record the parsing state of the MIPI signal every 10 frames (that is, every specified frequency A3 in the foregoing description). A method in which the electronic device 100 obtains the parsing state of the MIPI signal, to record the parsing state of the MIPI signal may include the following steps.

(1) In a possible implementation, the electronic device 100 may obtain the parsing state of the MIPI signal based on a check bit included in a radio frame of the MIPI signal. When the electronic device 100 determines, based on the check bit, that media information obtained through parsing is erroneous, the electronic device 100 may determine that there is an error when the MIPI signal is parsed, and record the MIPI signal parsing error state; or when the electronic device 100 determines, based on the check bit, that media information obtained through parsing is correct, the electronic device 100 may determine that the MIPI signal is correctly parsed, and record the MIPI signal parsing correct state. The check manner of the electronic device 100 based on the check bit may be parity check, cyclic redundancy check (CRC), Gray code check, or the like.

(2) In another possible implementation, a module (for example, the multi-media module, the SoC chip, or the like) that receives the MIPI signal in the electronic device 100 may send the media information obtained through parsing to a module (for example, the SoC chip, the multi-media module, or the like) that sends the MIPI signal, and the module that sends the MIPI signal may compare the media information obtained through parsing with original media information. When the module that sends the MIPI signal determines that the media information obtained through parsing is inconsistent with the original media information, the electronic device 100 may determine that there is an error when the MIPI signal is parsed, and record the MIPI signal parsing error state. When the module that sends the MIPI signal determines that the media information obtained through parsing is consistent with the original media information, the electronic device 100 may determine that the MIPI signal is parsed correctly and record the MIPI signal parsing correct state.

It should be noted that the electronic device 100 is not limited to the above method of obtaining the parsing state of the MIPI signal. In other embodiments, the electronic device 100 may alternatively obtain the parsing state of the MIPI signal by using another method, which is not limited in this application.

S108: When all antennas and multi-media devices in the electronic device 100 perform and complete the processes S103 to S107, the electronic device 100 counts the quantity of times of recording the MIPI signal parsing error state.

When all antennas and multi-media devices in the electronic device 100 perform and complete the processes S103 to S107, which may mean that when the electronic device 100 enables each antenna and each multi-media device to be in the working state, the specified reverse signal generated by S104 is superimposed with the signal transmitted through the MIPI signal line, so that the processes S103 to S107 are performed.

S109: The electronic device 100 determines whether traversing of parameter information that is of the reverse signals and that is pre-stored in the electronic device 100 is performed, and performs S103 to S108 based on the parameter information of each reverse signal.

Specifically, when the electronic device 100 determines that traversing of the parameter information that is of the reverse signals and that is pre-stored in the electronic device 100 is performed, and performs S103-S108 based on the parameter information of each reverse signal, the electronic device 100 may perform subsequent steps. When the electronic device 100 determines that traversing of the parameter information that is of the reverse signals and that is pre-stored in the electronic device 100 is not completed, that is, parameter information of one or more reverse signals are not used to generate a corresponding reverse signal for performing S103-S108, the electronic device 100 performs S103-S109 until the electronic device 100 determines that traversing of the parameter information that is of the reverse signals and that is pre-stored in the electronic device 100 is performed, and the electronic device 100 performs S103 to S108 based on the parameter information of each of the reverse signals, the electronic device 100 may perform the subsequent steps. In other words, for the parameter information that is of the plurality of reverse signals and that is pre-stored in the electronic device 100, after the parameter information of each of the reverse signals is used by the electronic device 100 to generate the corresponding reverse signal and perform S103-S108, the electronic device 100 performs the subsequent steps.

S110: When the electronic device 100 determines that traversing of the parameter information that is of the reverse signals and that is pre-stored in the electronic device 100 is performed, and performs S103-S108 based on the parameter information of each reverse signal, the electronic device 100 determines parameter information of an optimal reverse signal that is corresponding to a smallest quantity of times of recording the MIPI signal parsing error state or is corresponding to no MIPI signal parsing error state record.

Specifically, after the electronic device 100 completes S101-S109, the electronic device 100 may obtain a quantity of times of recording the MIPI signal parsing error state, corresponding to each reverse signal. The electronic device 100 determines a reverse signal that is corresponding to a smallest quantity of times of recording the MIPI signal parsing error state or is corresponding to no MIPI signal parsing error state record as an optimal reverse signal, where parameter information corresponding to the optimal reverse signal is parameter information of an optimal reverse signal.

For example, taking the foregoing Table 2 as an example, each reverse signal recorded in Table 2 is corresponding to a quantity of times of recording the MIPI signal parsing error state. For example, the quantity of times of recording the MIPI signal parsing error state corresponding to the reverse signal 1 is 30 times, the quantity of times of recording the MIPI signal parsing error state corresponding to the reverse signal 2 is 25 times, and the quantity of times of recording the MIPI signal parsing error state corresponding to the reverse signal 3 is 10 times. When the electronic device 100 determines that the quantity of times of recording the MIPI signal parsing error state corresponding to the reverse signal 3 is smallest, the electronic device 100 determines that the optimal reverse signal is the reverse signal 3, and the parameter information of the reverse signal 3 is the parameter information of the optimal reverse signal, including the following: the waveform of the reverse signal 3 is a square wave, the amplitude value of the reverse signal 3 is A1 mV, and the phase of the reverse signal 3 is 60 degrees.

S111: The electronic device 100 eliminates interference of the radio frequency signal coupled on the MIPI signal line based on the parameter information of an optimal reverse signal.

Specifically, the electronic device 100 may generate an optimal reverse signal based on the parameter information of an optimal reverse signal. Then, when the multi-media module and the radio frequency module in the electronic device 100 are in the working state, the SoC chip in the electronic device 100 may obtain the signal transmitted through the MIPI signal line. The SoC chip may superimpose the generated optimal reverse signal with the signal transmitted through the MIPI signal line. For the description of the signal transmitted through the MIPI signal line, refer to the foregoing description. Because the waveform of the optimal reverse signal is the same as the waveform of the radio frequency signal on the MIPI signal line, the phase of the optimal reverse signal is opposite to the phase of the radio frequency signal on the MIPI signal line, and compared with other reverse signals, the amplitude value of the optimal reverse signal is closer to the amplitude value of the radio frequency signal on the MIPI signal line, or is equal to the amplitude value of the radio frequency signal on the MIPI signal line. Therefore, when the SoC chip superimposes the optimal reverse signal onto the signal transmitted through the MIPI signal line, the optimal reverse signal can eliminate the interference of the radio frequency signal on the MIPI signal line, improving quality of MIPI signal transmission and improving accuracy of the MIPI signal parsing.

Figure 1C:
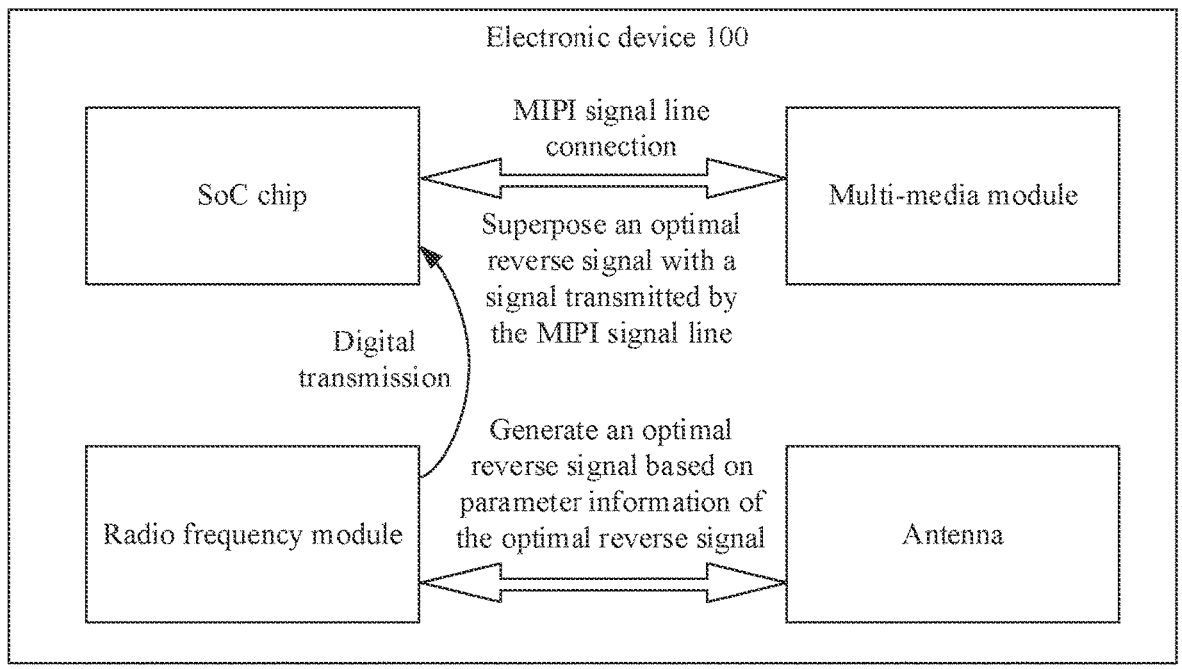
FIG. 1C is a schematic diagram of obtaining parameter information of an optimal reverse signal according to an embodiment of this application.

In a possible implementation, as shown in FIG. 1C, the baseband processor Modem of the radio frequency module in the electronic device 100 may obtain parameter information of an optimal reverse signal (that is, a waveform of an optimal reverse signal, an amplitude and a phase of an optimal reverse signal, and the like). Modem may then generate the optimal reverse signal based on the parameter information of the optimal reverse signal. The Modem may send the generated optimal reverse signal to the SoC chip in a form of binary data transmission (also referred to as digital transmission). The SoC chip may superimpose the optimal reverse signal to the signal transmitted through the MIPI signal line, to eliminate interference of the radio frequency signal coupled on the MIPI signal line.

In another possible implementation, the Modem in the electronic device 100 may send the waveform of the radio frequency signal to the SoC chip. The SoC chip may obtain the amplitude value and the phase that are of the optimal reverse signal and that are pre-stored in the electronic device 100. The SoC chip may then generate the optimal reverse signal based on the obtained waveform of the radio frequency signal (which is equal to the waveform of the optimal reverse signal), the amplitude value and the phase of the optimal reverse signal.

For step S111, further, when the SoC chip and the multi-media module in the electronic device 100 may be connected through a plurality of (for example, 3, 5 or 10) MIPI signal lines, each of the plurality of MIPI signal lines may use different reverse signal parameter information, or may use same reverse signal parameter information. For example, in this embodiment of this application, 10 MIPI signal lines are used to connect the SoC chip and the multi-media module. There may be the following cases in which the electronic device 100 eliminates the interference of the radio frequency signal coupled on the MIPI signal line based on the parameter information of the optimal reverse signal.

(1) The 10 MIPI signal lines use the same parameter information of the reverse signal. That is, in step S111, the electronic device 100 may generate the optimal reverse signal based on the parameter information of the optimal reverse signal. In the 10 MIPI signal lines, each MIPI signal line may use the foregoing optimal reverse signal to eliminate interference of a radio frequency signal coupled on each MIPI signal line.

Figure 1D:
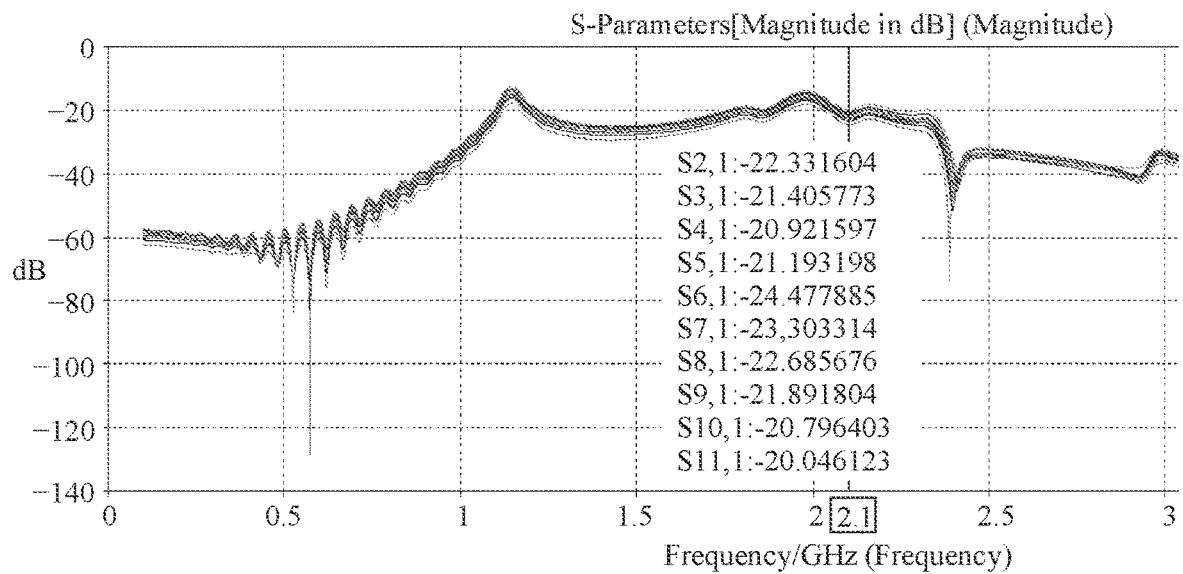
FIG. 1D is a schematic diagram of amplitude value differences according to an embodiment of this application.
Figure 1E:
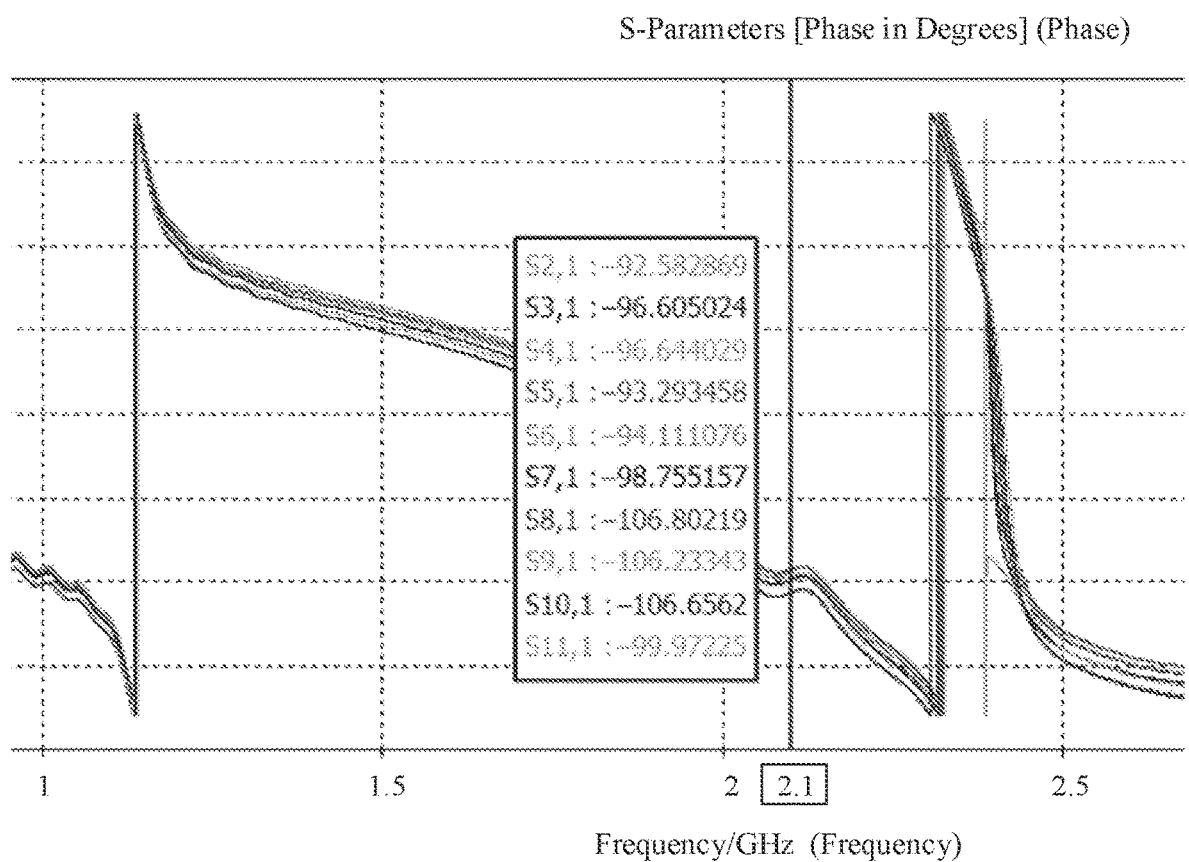
FIG. 1E is a schematic diagram of a phase difference according to an embodiment of this application.

For example, FIG. 1D shows values of isolation amplitudes between MIPI signal lines and the antenna, and FIG. 1E shows a phase difference between each MIPI signal line and an antenna. It can be seen from FIG. 1D and FIG. 1E that an amplitude difference between different MIPI signal lines is within a range of 2 dB, a phase difference between the different MIPI signal lines is within a range of 15 degrees, and the difference is small. Therefore, the parameter information of the same reverse signal can be used for all MIPI lines to implement cancellation.

(2) In the 10 MIPI signal lines, each MIPI signal line uses parameter information of respective corresponding reverse signal. That is, in step S111, the electronic device 100 generates the optimal reverse signal based on the parameter information of the optimal reverse signal. The MIPI signal line 1 may use the optimal reverse signal to eliminate interference of the radio frequency signal coupled on the MIPI signal line 1. For the specific implementation, refer to step S111. The optimal reverse signal corresponding to the MIPI signal line 1 may be referred to as an optimal reverse signal 1. The electronic device 100 may detect differences between an amplitude value and a phase of a radio frequency signal on another MIPI signal line and an amplitude value and a phase of a radio frequency signal on the MIPI signal 1 through signal simulation and/or actual measurement. Therefore, an amplitude value of a reverse signal corresponding to the another MIPI signal line may be obtained as follows: The amplitude value of the optimal reverse signal 1 is superimposed with the amplitude value difference between the radio frequency signal on the MIPI signal line and the radio frequency signal on the MIPI signal line 1. A phase of the reverse signal corresponding to the another MIPI signal line may be obtained as follows: The phase of the optimal reverse signal 1 is superposed with the phase difference between the radio frequency signal on the MIPI signal line and the radio frequency signal on the MIPI signal line 1. Waveform information of the reverse signal corresponding to the another MIPI signal line is the same as waveform information of the optimal reverse signal 1. The electronic device 100 may generate a reverse signal corresponding to each MIPI signal line based on an amplitude value, waveform information, and a phase of the reverse signal corresponding to each MIPI signal line. Each MIPI signal line may use the corresponding reverse signal to eliminate interference of the radio frequency signal coupled on each MIPI signal line.

Therefore, an amplitude value of a reverse signal (which may be referred to as an optimal reverse signal 2) corresponding to an MIPI signal line 2 may be obtained as follows: The amplitude value of the optimal reverse signal 1 is superimposed with an amplitude difference between the radio frequency signal on the MIPI signal line 2 and the radio frequency signal on the MIPI signal line 1. A phase of the reverse signal corresponding to the MIPI signal line 2 may be obtained as follows: The phase of the optimal reverse signal 1 is superposed with a phase difference between the radio frequency signal on the MIPI signal line 2 and the radio frequency signal on the MIPI signal line 1. The waveform information of the optimal reverse signal 1 is the same as waveform information of the optimal reverse signal 2. The electronic device 100 may generate the optimal reverse signal 2 based on the amplitude value, the waveform information, and the phase of the optimal reverse signal 2. The MIPI signal line 2 may use the optimal reverse signal 2 to eliminate interference of the radio frequency signal coupled on the MIPI signal line 2.

It should be noted that the radio frequency signal coupled on the MIPI signal line described in this application may also be referred to as a radio frequency signal on the MIPI signal line.

Next, another signal anti-interference method according to an embodiment of this application is described.

Figure 2A:
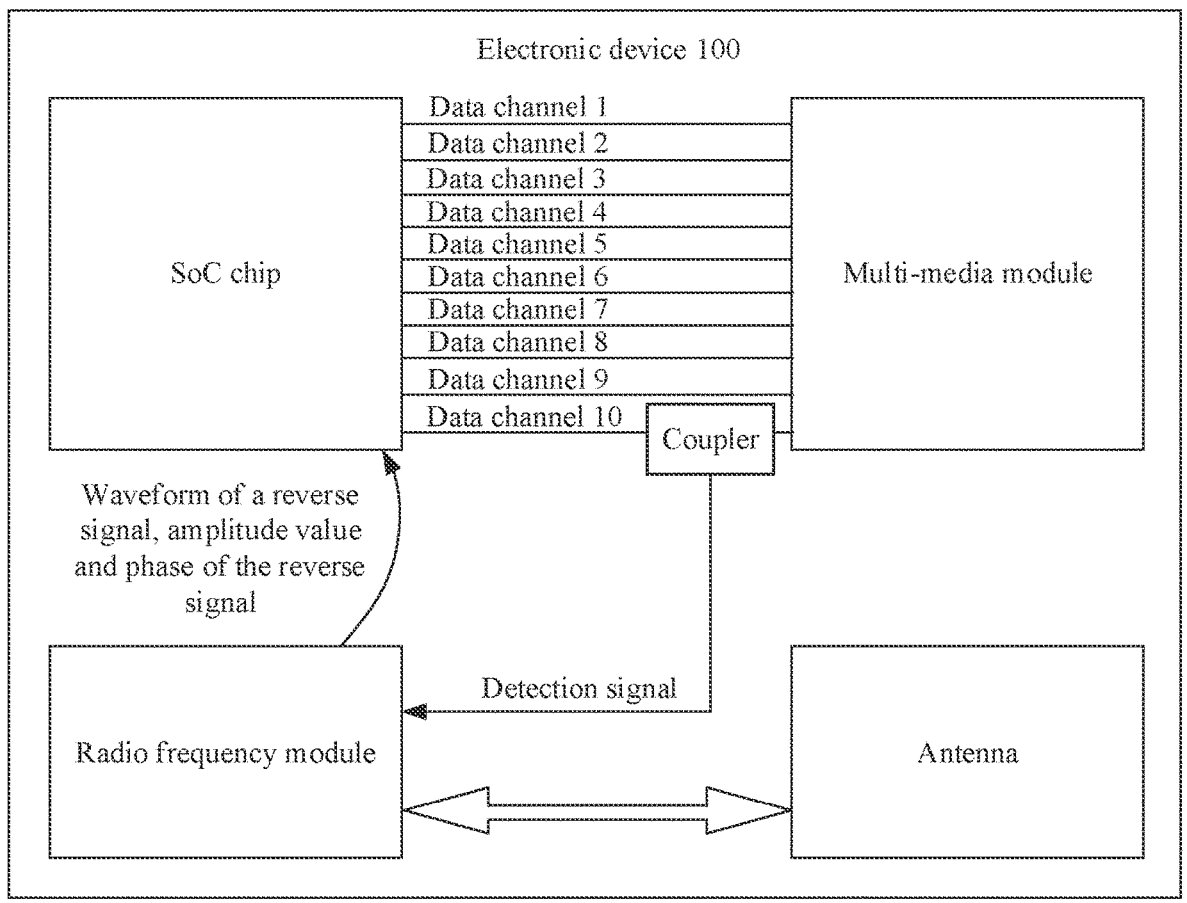
FIG. 2A is a schematic diagram of a structure of another hardware module according to an embodiment of this application.
Figure 2B:
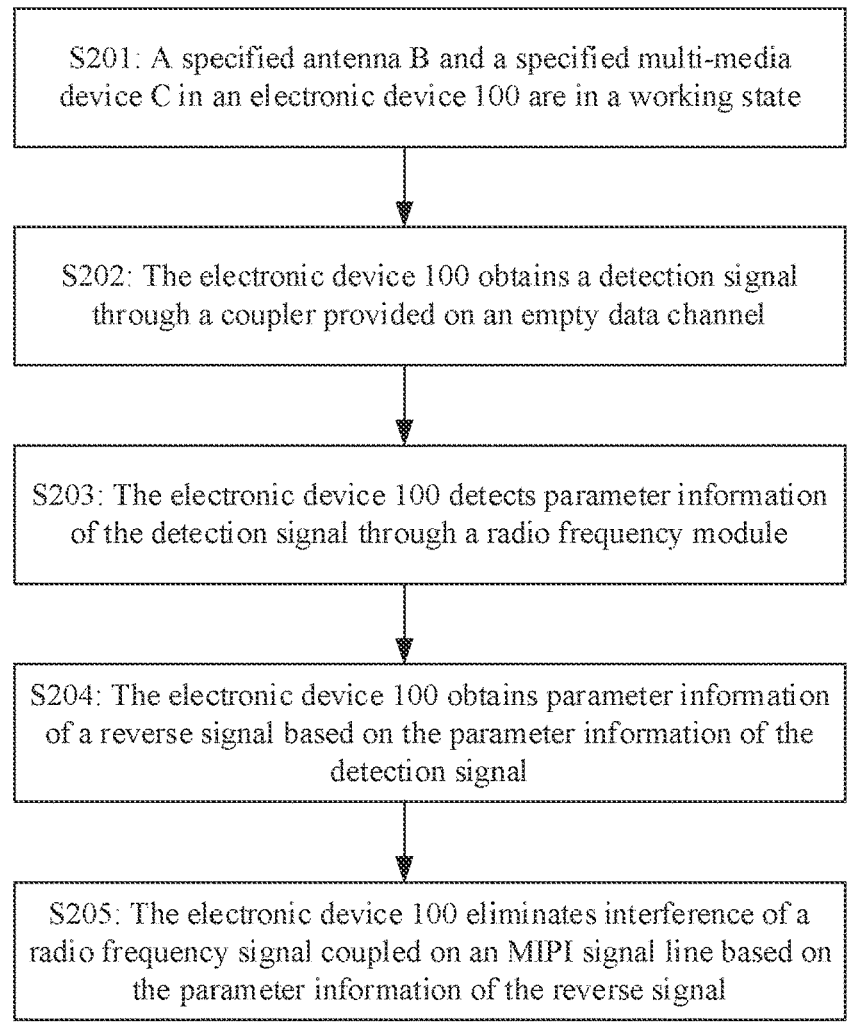
FIG. 2B is a schematic diagram of a specific procedure of another signal anti-interference method according to an embodiment of this application.

Another signal anti-interference method according to an embodiment of this application is described with reference to FIG. 2A to FIG. 2B. FIG. 2A shows a schematic diagram of a structure of hardware modules, and FIG. 2B shows a schematic diagram of a specific procedure of the signal anti-interference method.

As shown in FIG. 2A, the hardware module structure may include: a SoC chip, a multi-media module, a radio frequency module, and an antenna. For descriptions of the SoC chip, the multi-media module, the radio frequency module, and the antenna, refer to the description in the foregoing embodiment shown in FIG. 1A, and details are not described herein again. It should be noted that, in the hardware structure shown in FIG. 2A, the SoC chip and the multi-media module may transmit data information (for example, the foregoing media information) through a plurality of MIPI signal lines. For example, in this embodiment, the SoC chip and the multi-media module may transmit data information through 10 MIPI signal lines (which may also be referred to as data channels). The 10 MIPI signal lines may be referred to as a data channel 1 (that is, an MIPI signal line 1) to a data channel 10 (that is, an MIPI signal line 10).

In the 10 data channels, one data channel is an empty data channel (which may be referred to as a second signal line, for example, the data channel 10). On the empty data channel, a coupler may be provided. Preferably, a distance from the coupler to the SoC chip may be closer to a distance from the coupler to the multi-media module. The coupler may be used to obtain a radio frequency signal (which may also be referred to as a detection signal) that is partially or fully coupled on the empty data channel. The coupler may transmit the detection signal to the radio frequency module, so that the radio frequency module may obtain parameter information of a radio frequency signal coupled on an MIPI signal line based on the detection signal, to eliminate interference of the radio frequency signal. In other implementations, the coupler may alternatively be disposed at another location on the empty data channel, which is not limited in this application. The SoC chip and the multi-media module may alternatively transmit data information through 8 and 9 MIPI signal lines, that is, a quantity of MIPI signal lines is not limited in this application.

It should be noted that the empty data channel described above does not transmit an MIPI signal, and the coupler is provided on the empty data channel, so that for a normal data channel on which a coupler is not provided, an MIPI signal line still has an impedance of 50 ohms, so that transmission quality of the MIPI signal is not affected, and parsing the MIPI signal by the multi-media module/SoC chip is not affected. That is, the multi-media module/SoC chip may parse MIPI signals transmitted by the plurality of data channels other than the empty data channel, to obtain complete and accurate media information.

As shown in FIG. 2B, a specific flow of the signal anti-interference method may include the following steps.

S201: A specified antenna B and a specified multi-media device C in the electronic device 100 are in a working state.

Specifically, the electronic device transmits a radio frequency signal through the radio frequency module. The specified antenna B may be an antenna that sends a mobile communication signal or a wireless communication signal, for example, an NR78 antenna, an LTEB41 antenna, a 5 g antenna, a Wi-Fi antenna, or the like. The specified multi-media device C may be a camera device, such as a 50-million-pixel main camera (which may also be referred to as a 50 M main camera), a 100-million-pixel main camera (which may also be referred to as a 100 M main camera), an 8-million-pixel front camera (which may also be referred to as an 8 M front camera), a 2-million-pixel macro camera, or the like. The specified multi-media device C may alternatively be a display device, such as a display. The specified multi-media device C may alternatively be another device for processing media information such as text, data, graphics, images, animation, sound and the like, which is not limited in this application. When the specified antenna B is in the working state, a radio frequency signal transmitted or received by the specified antenna B may be coupled to an MIPI signal line connected to the specified multi-media device C, and consequently transmission quality of the MIPI signal is interfered.

S202: The electronic device 100 obtains the detection signal through the coupler provided on the empty data channel.

For description of the empty data channel, refer to the foregoing description, and details are not described herein again.

Specifically, the coupler may obtain the detection signal from the empty data channel, and the detection signal is a radio frequency signal that is all or partially coupled on the empty data channel. Further, the coupler may obtain the detection signal from the empty data channel at every specified period (for example, every 0.5 millisecond, 1 milliseconds, or the like). A value of the specified period is not limited in this embodiment of this application.

S203: The electronic device 100 detects parameter information of the detection signal through the radio frequency module.

Specifically, the coupler may transmit the detection signal obtained from the empty data channel to the Modem in the radio frequency module. After obtaining the detection signal, the Modem may detect the parameter information of the detection signal. The parameter information of the detection signal includes one or more of the following: a phase of the detection signal, an amplitude value of the detection signal, a waveform of the detection signal, and the like. Further, the Modem may detect the parameter information of the detection signal based on a signal detection method such as an envelope detection method and/or a frequency modulation detection method, and/or a phase shift detection method. In a possible implementation, in addition to the Modem, the electronic device 100 may detect the detection signal by using another module in the radio frequency module, to obtain the parameter information of the detection signal.

S204: The electronic device 100 obtains parameter information of a reverse signal based on the parameter information of the detection signal.

For the description of the parameter information of the reverse signal, refer to the foregoing description, and details are not described herein again.

Specifically, a phase of the reverse signal and a phase of the detection signal are opposite, a waveform of the reverse signal is a waveform of the detection signal, and an amplitude value of the reverse signal is an amplitude value of the detection signal. Therefore, when the Modem in the electronic device 100 detects the parameter information of the detection signal, the Modem may send the parameter information of the detection signal to the SoC chip. The SoC chip may obtain the parameter information of the reverse signal based on the parameter information of the detection signal. In a possible implementation, the Modem may alternatively obtain the parameter information of the reverse signal based on the parameter information of the detection signal, and then send the parameter information of the reverse signal to the SoC chip.

S205: The electronic device 100 eliminates interference of the radio frequency signal coupled on the MIPI signal line based on the parameter information of the reverse signal.

Specifically, as shown in FIG. 2A, the SoC chip in the electronic device 100 may obtain the parameter information of the reverse signal (for example, the waveform of the reverse signal, the amplitude value and the phase of the reverse signal, or the like) from the Modem of the radio frequency module. The SoC chip may then generate a corresponding reverse signal based on the parameter information of the reverse signal. Next, the SoC chip may superimpose the reverse signal generated as described above with a signal transmitted on the MIPI signal line. For the description of the signal transmitted by the MIPI signal line, refer to the foregoing description. Because the waveform of the reverse signal is the same as the waveform of the radio frequency signal on the MIPI signal line, the phase of the reverse signal is opposite to the phase of the radio frequency signal on the MIPI signal line, and the amplitude value of the reverse signal is the same as the amplitude value of the radio frequency signal on the MIPI signal line. Therefore, when the SoC chip superimposes the reverse signal with the signal transmitted on the MIPI signal line, the reverse signal can eliminate the interference of the radio frequency signal on the MIPI signal line, to improve the quality of the MIPI signal transmission and improve accuracy of the MIPI signal parsing.

In a possible implementation, the Modem of the radio frequency module in the electronic device 100 may obtain the parameter information of the reverse signal. Then, the Modem may generate a corresponding reverse signal based on the parameter information of the reverse signal, and send the reverse signal to the SoC chip. The SoC chip may eliminate the interference of the radio frequency signal on the MIPI signal line based on the reverse signal.

It can be seen from the above process that in the implementation process of the signal anti-interference method shown in FIG. 2B, the parameter information of the reverse signal is obtained based on the detection signal, and the detection signal is obtained from the empty data channel by the coupler provided on the empty data channel. Therefore, in the signal anti-interference method, the electronic device 100 can more accurately eliminate the interference of the radio frequency signal on the MIPI signal line based on the reverse signal, so that the accuracy of the MIPI signal parsing is significantly improved.

For step S205, further, when the SoC chip and the multi-media module in the electronic device 100 may be connected through a plurality of (for example, 3, 5 or 10) MIPI signal lines, each of the plurality of MIPI signal lines may use different reverse signal parameter information, or may use same reverse signal parameter information. For example, in this embodiment of this application, 10 MIPI signal lines are used to connect the SoC chip and the multi-media module. There may be the following cases in which the electronic device 100 eliminates the interference of the radio frequency signal coupled on the MIPI signal line based on the parameter information of the reverse signal.

(1) The 10 MIPI signal lines use the same parameter information of the reverse signal. That is, in step S205, the electronic device 100 may generate a corresponding reverse signal based on the parameter information of the reverse signal. In the 10 MIPI signal lines, each MIPI signal line may use the foregoing reverse signal to eliminate interference of a radio frequency signal coupled on each MIPI signal line.

(2) In the 10 MIPI signal lines, each MIPI signal line uses parameter information of respective corresponding reverse signal. That is, in step S205, the electronic device 100 generates a corresponding reverse signal based on the parameter information of the reverse signal. An MIPI signal line 1 (which may be referred to as a first signal line) may use the reverse signal to eliminate interference of a radio frequency signal coupled on the MIPI signal line 1 to obtain a second processing signal. For a specific implementation, refer to step S205. The reverse signal corresponding to the MIPI signal line 1 may be referred to as a reference reverse signal (which may be referred to as a first signal). A signal transmitted on the MIPI signal line 1 may be referred to as a first processing signal. To be specific, the multi-media module on the electronic device 100 sends the first processing signal through the MIPI signal line 1. The SoC chip receives the first processing signal from the MIPI signal line 1. The first processing signal includes an MIPI signal (which may also be referred to as a second processing signal) that carries media information, and a radio frequency signal (which may be referred to as a first radio frequency signal) that is coupled on the MIPI signal line 1. Waveform information of the first signal is the same as waveform information of the first radio frequency signal, an amplitude value of the first signal is the same as an amplitude value of the first radio frequency signal, and a phase of the first signal differs 180 degrees from a phase of the first radio frequency signal.

The electronic device 100 may detect differences between an amplitude value and a phase of a radio frequency signal on another MIPI signal line and an amplitude value and a phase of the radio frequency signal on the MIPI signal 1 through signal simulation and/or actual measurement. Therefore, an amplitude value of a reverse signal corresponding to the another MIPI signal line may be obtained as follows: The amplitude value of the reference reverse signal is superimposed with the amplitude difference between the radio frequency signal on the MIPI signal line and the radio frequency signal on the MIPI signal line 1. A phase of the reverse signal corresponding to the another MIPI signal line may be obtained as follows: The phase of the reference reverse signal is superposed with the phase difference between the radio frequency signal on the MIPI signal line and the radio frequency signal on the MIPI signal line 1. Waveform information of the reverse signal corresponding to the another MIPI signal line is the same as waveform information of the reference reverse signal. The electronic device 100 may generate a reverse signal corresponding to each MIPI signal line based on an amplitude value, waveform information, and a phase of the reverse signal corresponding to each MIPI signal line. Each MIPI signal line may use the corresponding reverse signal to eliminate interference of the radio frequency signal coupled on each MIPI signal line.

For example, an amplitude value of a reverse signal (which may be referred to as a second signal) corresponding to an MIPI signal line 2 (which may be referred to as a third signal line) may be obtained as follows: The amplitude value of the reference reverse signal is superimposed with an amplitude difference value between the radio frequency signal on the MIPI signal line 2 and the radio frequency signal on the MIPI signal line 1. A phase of the reverse signal corresponding to the MIPI signal line 2 may be obtained as follows: The phase of the reference reverse signal is superposed with a phase difference value between the radio frequency signal on the MIPI signal line 2 and the radio frequency signal on the MIPI signal line 1. Waveform information of the reverse signal corresponding to the MIPI signal line 2 is the same as waveform information of the reference reverse signal. The electronic device 100 may generate the reverse signal corresponding to the MIPI signal line 2 based on the amplitude value, the waveform information, and the phase of the reverse signal corresponding to the MIPI signal line 2. The MIPI signal line 2 may use the reverse signal corresponding to the MIPI signal line 2 to eliminate interference of the radio frequency signal coupled on the MIPI signal line 2.

The following describes still another signal anti-interference method according to an embodiment of this application.

Figure 3:
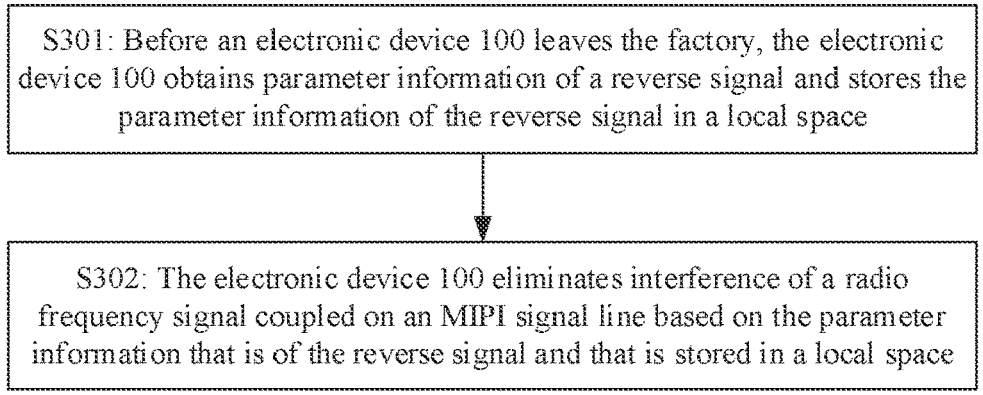
FIG. 3 is a schematic diagram of a specific procedure of still another signal anti-interference method according to an embodiment of this application.

Still another signal anti-interference method according to an embodiment of this application is described with reference to FIG. 1A and FIG. 3. FIG. 1A is a schematic diagram of a structure of hardware modules. For the description of the schematic diagram of a structure of hardware modules shown in FIG. 1A, refer to the description in the foregoing embodiments, and details are not described herein again. FIG. 3 is a schematic diagram of a specific procedure of a signal anti-interference method according to an embodiment.

As shown in FIG. 3, a specific flow of the signal anti-interference method may include the following steps.

S301: Before an electronic device 100 leaves the factory, the electronic device 100 obtains parameter information of a reverse signal and stores the parameter information of the reverse signal in a local space.

For the description of the parameter information of the reverse signal, refer to the foregoing description, and details are not described herein again.

Specifically, that the electronic device 100 obtains parameter information of a reverse signal may include the following steps: The electronic device 100 obtains waveform information of the reverse signal, the electronic device 100 obtains an amplitude value of the reverse signal, and the electronic device 100 obtains a phase of the reverse signal. After the electronic device 100 obtains the parameter information of the reverse signal, the electronic device 100 may store the parameter information of the reverse signal.

For a method for obtaining the parameter information of the reverse signal by the electronic device 100, refer to the following description.

(1) The electronic device 100 obtains waveform information of the reverse signal.

The waveform information of the reverse signal is waveform information of a radio frequency signal coupled on the MIPI signal line. When a radio frequency module in the electronic device 100 and/or an antenna connected to the radio frequency module is in a working state, a Modem of the radio frequency module in the electronic device 100 may obtain waveform information of the radio frequency signal. Then, the radio frequency module in the electronic device 100 may send the obtained waveform of the radio frequency signal to a SoC chip. It may be understood that the waveform of the radio frequency signal is the waveform of a reverse signal. In some other implementations, the electronic device 100 may obtain the waveform of the reverse signal through other methods, which is not limited in this application.

(2) The electronic device 100 obtains an amplitude value of the reverse signal.

The amplitude value of the reverse signal is an amplitude value of the radio frequency signal coupled on the MIPI signal line. The electronic device 100 may obtain the amplitude value of the radio frequency signal coupled on the MIPI signal line through signal simulation and/or actual measurement before the electronic device 100 leaves the factory. In some other implementations, the electronic device 100 may alternatively obtain the amplitude value of the reverse signal by other methods, which is not limited in this application.

(3) The electronic device 100 obtains a phase of the reverse signal.

The phase of the radio frequency signal coupled on the MIPI signal line is related to a coupling path and a surrounding medium. That is, different coupling paths may affect the phase of the radio frequency signal coupled on the MIPI signal line, and a length of the medium, and a uniformity degree of the medium may also affect the phase of the radio frequency signal coupled on the MIPI signal line. It should be noted that the coupling path refers to a path through which some or all of electromagnetic energy is transmitted from a transmitting end to another circuit or apparatus, and the coupling path is related to a product structure of the electronic device 100.

Before the electronic device 100 leaves the factory, a signal simulation test may be performed on a test device, to obtain a phase (which may also be referred to as a phase baseline value) of a radio frequency signal coupled on an MIPI signal line in the test device. A product structure of the test device is the same as the product structure of the electronic device 100. The electronic device 100 may then test the phase of the radio frequency signal coupled on the MIPI signal line in the electronic device 100, and a difference (which may also be referred to as a phase difference value) from the phase baseline value. Therefore, the phase of the radio frequency signal coupled on the MIPI signal line in the electronic device 100 is a value obtained by summing the phase baseline value and the phase difference value. The phase of the reverse signal for the electronic device 100 differs 180 degrees from the phase of the radio frequency signal coupled on the MIPI signal line in the electronic device 100.

S302: The electronic device 100 eliminates interference of the radio frequency signal coupled on the MIPI signal line based on the parameter information of the reverse signal in the local space.

Specifically, the electronic device 100 may generate a corresponding reverse signal based on the parameter information of the reverse signal. Then, when a multi-media module and the radio frequency module in the electronic device 100 are in the working state, the electronic device transmits the radio frequency signal through the radio frequency module. The SoC chip in the electronic device 100 may obtain a signal transmitted through the MIPI signal line. The SoC chip may superimpose the generated reverse signal with the signal transmitted through the MIPI signal line. For the description of the signal transmitted through the MIPI signal line, refer to the foregoing description. Because the waveform of the reverse signal is the same as the waveform of the radio frequency signal on the MIPI signal line, the phase of the reverse signal is opposite to the phase of the radio frequency signal on the MIPI signal line, and the amplitude value of the reverse signal is the same as the amplitude value of the radio frequency signal on the MIPI signal line. Therefore, when the SoC chip superimposes the reverse signal with the signal transmitted on the MIPI signal line, the reverse signal can eliminate interference of the radio frequency signal on the MIPI signal line, to improve quality of MIPI signal transmission and improve accuracy of MIPI signal parsing.

In a possible implementation, the baseband processor Modem of the radio frequency module in the electronic device 100 may obtain the parameter information of the reverse signal. Then, the Modem may generate a corresponding reverse signal based on the parameter information of the reverse signal. In a possible implementation, the Modem in the electronic device 100 may send the waveform of the radio frequency signal to the SoC chip. The SoC chip may obtain the amplitude value and the phase that are of the reverse signal and that are pre-stored in the electronic device 100. Then, the SoC chip may generate a corresponding reverse signal based on the obtained waveform of the reverse signal, the amplitude value and the phase of the reverse signal.

For step S302, further, when the SoC chip and the multi-media module in the electronic device 100 may be connected through a plurality of (for example, 3, 5 or 10) MIPI signal lines, each of the plurality of MIPI signal lines may use different reverse signal parameter information, or may use same reverse signal parameter information. For example, in this embodiment of this application, 10 MIPI signal lines are used to connect the SoC chip and the multi-media module. There may be the following cases in which the electronic device 100 eliminates the interference of the radio frequency signal coupled on the MIPI signal line based on the parameter information of the reverse signal.

(1) The 10 MIPI signal lines use the same parameter information of the reverse signal. That is, in step S302, the electronic device 100 may generate a corresponding reverse signal based on the parameter information of the reverse signal in the local space. In the 10 MIPI signal lines, each MIPI signal line may use the foregoing reverse signal to eliminate interference of a radio frequency signal coupled on each MIPI signal line.

(2) In the 10 MIPI signal lines, each MIPI signal line uses parameter information of respective corresponding reverse signal. That is, in step S302, the electronic device 100 generates the corresponding reverse signal based on the parameter information of the reverse signal in the local space. An MIPI signal line 1 may use a reverse signal to eliminate interference of a radio frequency signal coupled on the MIPI signal line 1. For the specific implementation, refer to step S302. The reverse signal corresponding to the MIPI signal line 1 may be referred to as a reference reverse signal. The electronic device 100 may detect differences between an amplitude value and a phase of a radio frequency signal on another MIPI signal line and an amplitude value and a phase of the radio frequency signal on the MIPI signal 1 through signal simulation and/or actual measurement. Therefore, the amplitude value of a reverse signal corresponding to the another MIPI signal line may be obtained as follows: An amplitude value of the reference reverse signal is superimposed with the amplitude difference between the radio frequency signal on the MIPI signal line and the radio frequency signal on the MIPI signal line 1. The phase of the reverse signal corresponding to the another MIPI signal line may be obtained as follows: The phase of the reference reverse signal is superposed with the phase difference between the radio frequency signal on the MIPI signal line and the radio frequency signal on the MIPI signal line 1. Waveform information of the reverse signal corresponding to the another MIPI signal line is the same as waveform information of the reference reverse signal. The electronic device 100 may generate a reverse signal corresponding to each MIPI signal line based on an amplitude value, waveform information, and a phase of the reverse signal corresponding to each MIPI signal line. Each MIPI signal line may use the corresponding reverse signal to eliminate interference of the radio frequency signal coupled on each MIPI signal line.

For example, an amplitude value of a reverse signal corresponding to an MIPI signal line 2 may be obtained as follows: The amplitude value of the reference reverse signal is superimposed with an amplitude difference between a radio frequency signal on the MIPI signal line 2 and the radio frequency signal on the MIPI signal line 1. A phase of the reverse signal corresponding to the MIPI signal line 2 may be obtained as follows: The phase of the reference reverse signal is superposed with a phase difference between the radio frequency signal on the MIPI signal line 2 and the radio frequency signal on the MIPI signal line 1. Waveform information of the reverse signal corresponding to the MIPI signal line 2 is the same as waveform information of the reference reverse signal. The electronic device 100 may generate the reverse signal corresponding to the MIPI signal line 2 based on the amplitude value, the waveform information, and the phase of the reverse signal corresponding to the MIPI signal line 2. The MIPI signal line 2 may use the reverse signal corresponding to the MIPI signal line 2 to eliminate interference of the radio frequency signal coupled on the MIPI signal line 2.

It should be noted that, if the Modem is integrated on the SoC chip, the process performed by the SoC chip in the foregoing signal anti-interference method is executed by a central processing unit (CPU)

Next, a hardware structure of an electronic device 100 provided in this embodiment of this application is introduced.

Figure 4:
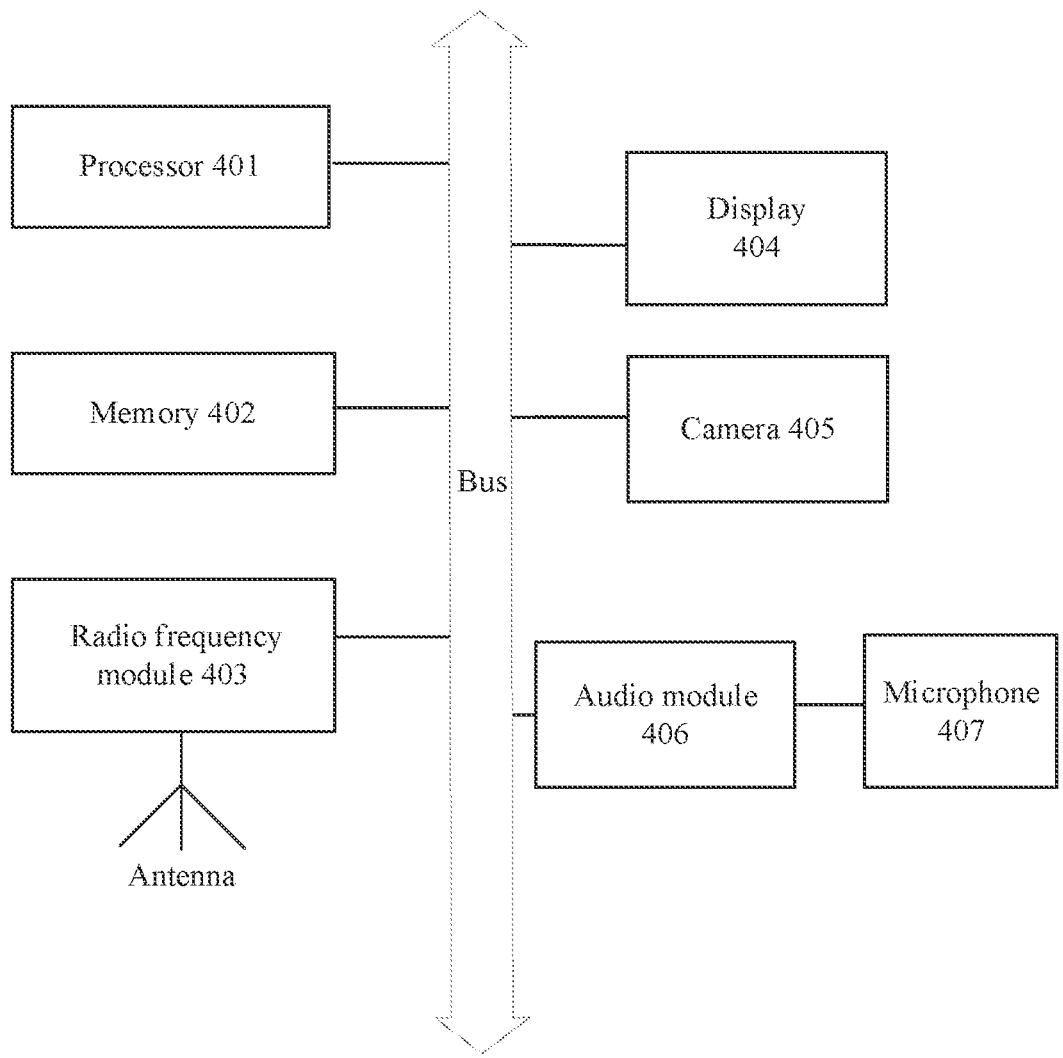
FIG. 4 is a schematic diagram showing a hardware structure of an electronic device 100 according to an embodiment of this application.

FIG. 4 shows an example of a schematic diagram of a hardware structure of an electronic device 100 according to an embodiment of this application.

As shown in FIG. 4, the electronic device 100 may include a processor 401, a memory 402, a radio frequency module 403, a display 404, a camera 405, an audio module 406 and a microphone 407.

It may be understood that the structure illustrated in this embodiment of this application constitutes no specific limitation on the electronic device 100. In some other embodiments of this application, the electronic device 100 may further include more or fewer components than those shown in the figure, or may combine some components, or may split some components, or may have different component arrangements. The components shown in the figure may be implemented by hardware, software, or a combination of software and hardware.

The processor 401 may include one or more processing units. For example, the processor 401 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be separate devices, or may be integrated into one or more processors. The controller may generate an operation control signal based on an instruction operation code and a time sequence signal, to control instruction reading and instruction execution.

The processor 401 may further be provided with a memory. The memory is configured to store instructions and data. In some embodiments, the memory in the processor 401 is a cache. The memory may store instructions or data just used or cyclically used by the processor 401. If the processor 401 needs to use the instruction or the data again, the processor 401 may directly invoke the instruction or the data from the memory. This prevents repeated access and reduces a time for which the processor 401 waits, increasing system efficiency.

In some embodiments, the processor 401 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). The processor 401 may be respectively coupled to the touch sensor (not shown in FIG. 4), a charger (not shown in FIG. 4), a flash light (not shown in FIG. 4), the camera 405, and the like through different I2C bus interfaces.

The I2S interface may be used for audio communication. The processor 401 may be coupled to the audio module 406 by the I2S bus to implement communication between the processor 401 and the audio module 406.

The PCM interface may also be used for audio communication, and sampling, quantization, and encoding of an analog signal. Both the I2S interface and the PCM interface may be configured to perform audio communication.

The UART interface is a universal serial data bus, and is configured to perform asynchronous communication. The bus converts to-be-transmitted data between serial communication and parallel communication.

The MIPI interface may be configured to connect the processor 401 to a peripheral component such as the display 404 or the camera 405. The MIPI interface includes a camera serial interface (CSI), a display serial interface (DSI), and the like.

The GPIO interface may be configured by software. The GPIO interface may be configured as a control signal or a data signal.

The USB interface is an interface that complies with USB standard specifications, and may be specifically a Mini USB interface, a Micro USB interface, a USB Type C interface, or the like. The USB interface may be configured to connect to a charger to charge the electronic device 100, or may be configured to transmit data between the electronic device 100 and a peripheral device. The USB interface may alternatively be configured to be connected to a headset to play audio through the headset. Alternatively, the port may be configured to connect to another electronic device, for example, an AR device.

It may be understood that an interface connection relationship between modules illustrated in embodiments of the present invention is merely an illustrative description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The memory 402 is coupled to the processor 401, and is configured to store various software programs and/or a plurality of sets of instructions. In specific implementation, the memory 402 may include a volatile memory, for example, a random access memory (RAM); or may include a non-volatile memory, for example, a ROM, a flash memory, a hard disk drive (HDD), or a solid state drive (SSD). The memory 402 may alternatively include a combination of the foregoing types of memories. The memory 402 may further store some program code, so that the processor 401 can easily invoke the program code stored in the memory 402, to implement the method for implementing the electronic device 100 in this embodiment of this application. The memory 402 may store an operating system, for example, an embedded operating system such as uCOS, VxWorks, or RTLinux.

The radio frequency module 403 may provide a solution to wireless communication applied to the electronic device 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The radio frequency module 403 may alternatively provide a solution applied to the electronic device 100 for wireless communication including 2G/3G/4G/5G and the like. The radio frequency module 403 may be one or more devices integrating at least one communication processing module. The radio frequency module 403 receives an electromagnetic wave through the antenna, performs frequency modulation and filtering processing on an electromagnetic wave signal, and sends a processed signal to the processor 401. The radio frequency module 403 may further receive a to-be-sent signal from the processor 401, perform frequency modulation and amplification on the signal, and convert the signal into an electromagnetic wave for radiation through the antenna.

The display 404 may be configured to display an image, a video, and the like. The display 404 may include a display panel. The display panel may be a liquid crystal display (LCD), an organic light-emitting diode (OLED), an active-matrix organic light-emitting diode (AMOLED), a flexible light-emitting diode (FLED), a Mini-LED, a Micro-LED, a Micro-OLED, a quantum dot light emitting diode (QLED), or the like. In some embodiments, the electronic device 100 may include 1 or N displays 404. N is a positive integer greater than 1.

The camera 405 may be configured to capture a still image or a video. An optical image of an object is generated through a lens and is projected onto a photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a format such as standard RGB or YUV. In some examples, the electronic device 100 may include 1 or N cameras 405. N is a positive integer greater than 1.

The audio module 406 may be configured to convert digital audio information into an analog audio signal for output, and may also be configured to convert an analog audio input into a digital audio signal. The audio module 406 may be further configured to encode and decode the audio signal. In some embodiments, the audio module 406 may further be disposed in the processor 401, or some functional modules of the audio module 406 are disposed in the processor 401.

It may be understood that the display 404, the camera 405, and the audio module 406 in this embodiment of this application can be collectively referred to as a multi-media module in the foregoing embodiments.

The microphone 407, which is also referred to as a "mike" or a "mic", is used to obtain a sound signal in a surrounding environment of the electronic device, convert the sound signal into an electrical signal, and then perform a series of processing such as analog-to-digital conversion on the electrical signal to obtain an audio signal in a digital form that is processable by a processor 401 of the electronic device. When making a call or sending voice information, a user may speak with the mouth approaching the microphone 407, to input a sound signal to the microphone 407. At least one microphone 407 may be disposed in the electronic device 100. In some other embodiments, the electronic device 100 may be provided with two microphones 407, and may further implement a noise reduction function in addition to collecting a sound signal. In some other embodiments, the electronic device 100 may alternatively be provided with three, four, or more microphones 407, to collect a sound signal, reduce noise, further identify a sound source, implement a directional recording function, and the like.

The electronic device 100 may also include a sensor module (not shown in FIG. 4) and/or a touch sensor (not shown in FIG. 4). The touch sensor may also be referred to as a "touch device". The touch sensor may be disposed on the display 404, and the touch sensor and the display 404 form a touchscreen, which is also referred to as a "touch screen". The touch sensor may be configured to detect a touch operation on or near the touch sensor. Optionally, the sensor module may further include a gyroscope sensor (not shown in FIG. 4), an acceleration sensor (not shown in FIG. 4), and the like. The gyroscope sensor may be configured to determine a motion posture of the electronic device 100. In some embodiments, the electronic device 100 may determine an angular velocity of the electronic device 100 around three axes (namely, x, y, and z axes) through the gyroscope sensor. The acceleration sensor may be configured to detect an acceleration of the electronic device 100 in various directions (generally x, y, and z axes), and can also detect a magnitude and a direction of gravity when the electronic device 100 is stationary.

It should be noted that the electronic device 100 shown in FIG. 4 is only used as an example to explain the hardware structure of the electronic device provided in this application and does not constitute a specific limitation on this application.

A software architecture of the electronic device 100 according to an embodiment of this application is described below.

Figure 5:
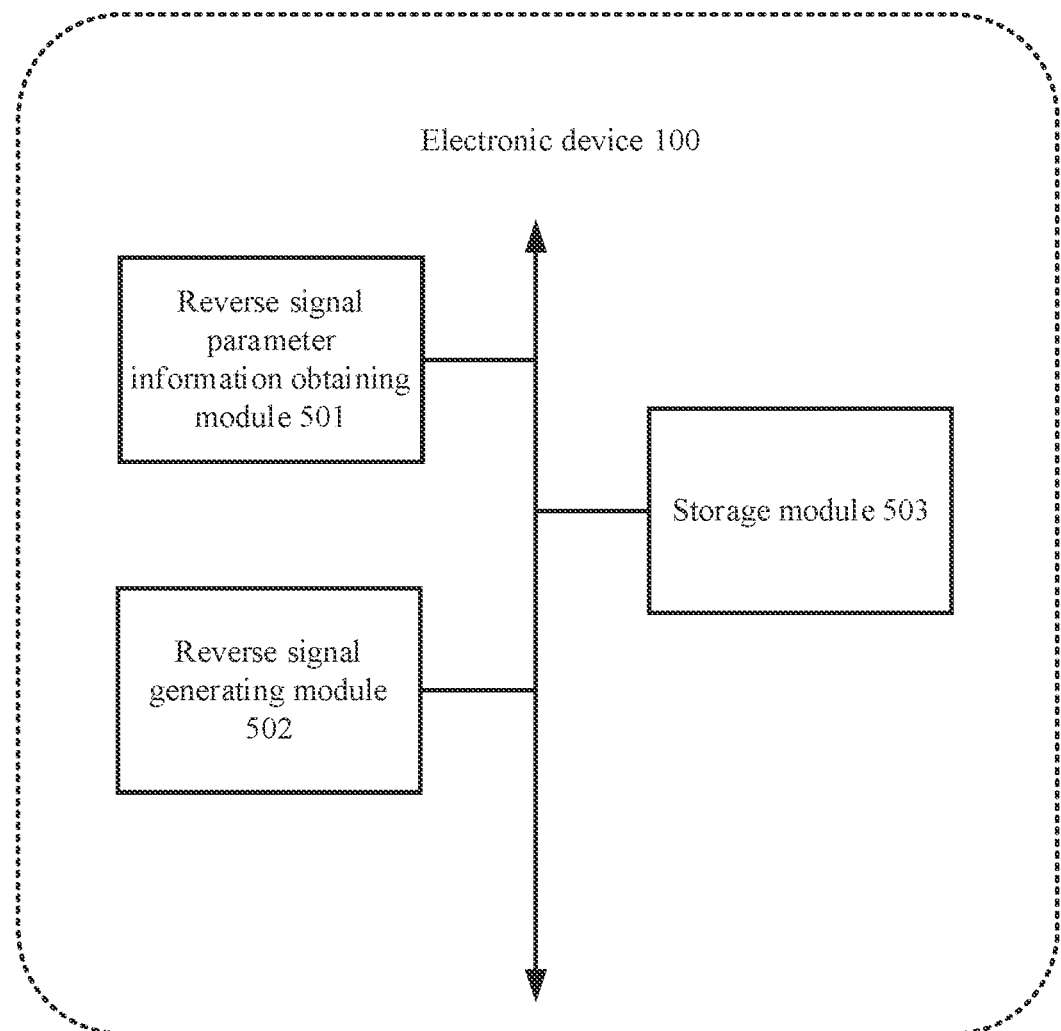
FIG. 5 is a schematic diagram of a software architecture of an electronic device 100 according to an embodiment of this application.

FIG. 5 is an example schematic diagram of a software architecture of an electronic device 100 according to an embodiment of this application. It should be noted that the electronic device 100 may be the electronic device mentioned in the procedures of the foregoing embodiments.

As shown in FIG. 5, software modules in the electronic device 100 may include but are not limited to the following modules: a reverse signal parameter information obtaining module 501, a reverse signal generating module 502, and a memory module 503.

The reverse signal parameter information obtaining module 501 may obtain parameter information of a reverse signal based on a radio frequency signal coupled on an MIPI signal. For description of the parameter information of the reverse signal and the specific implementation of obtaining the reverse signal parameter information, refer to the foregoing embodiments, and details are not described herein again.

The reverse signal generating module 502 may be configured to generate a corresponding reverse signal based on the parameter information of the reverse signal obtained by the reverse signal parameter information obtaining module 501. The generated reverse signal may be used to eliminate a radio frequency signal on an MIPI signal line, so that the electronic device 100 obtains a high-quality MIPI signal, and improves accuracy of MIPI signal parsing. For the specific implementation of generating the reverse signal, refer to the foregoing embodiments and details are not described herein again.

The memory module 503 may be configured to store the parameter information of the reverse signal obtained by the reverse signal parameter information obtaining module 501, and/or used to store the reverse signal generated by the reverse signal generating module 502. The memory module 503 may further store some program code, to implement the method implemented in the electronic device 100 in embodiments of this application. A specific implementation may be similar to the implementation described in the foregoing embodiments, and details are not described herein again.

As used in the foregoing embodiments, the term "when . . . " may be interpreted to mean "if . . . ", "after . . . ", "in response to it is determined that . . . ", or "in response to it is detected . . . ", depending on the context. Similarly, the phrases "when it is determined" or "if the [described condition or event] is detected" may be interpreted, depending on the context, as "if it is determined that . . . " or "in response to it is determined that . . . " or "when the [described condition or event] is detected" or "in response to detection of the [described condition or event]".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, all or some of the processes or functions according to embodiments of this application are produced. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one network site, computer, server or data center to another network site, computer, server or data center in a wired (such as a coaxial cable, an optical fiber, or a digital subscriber line) or wireless (such as infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

Persons of ordinary skill in the art may understand that all or some of the procedures in the methods in the foregoing embodiments may be implemented by using a computer program instructing related hardware. The program may be stored in a computer-readable storage medium. When the program is executed, the procedures in the foregoing method embodiments may be performed. The foregoing storage medium includes any medium that can store program code, such as a ROM, a random access memory RAM, a magnetic disk, or an optical disc.

The invention claimed is:

1. A signal anti-interference method, applied to an electronic device comprising a system-on-chip (SoC) chip, a first information processor, and a radio frequency device, wherein the first information processor comprises a first device, the SoC chip and the first information processor are connected through a first signal line, and the radio frequency device comprises a first antenna, wherein the method comprises:
triggering, by the electronic device, the first device and the first antenna to be in a working state;
transmitting, by the radio frequency device in the electronic device, a radio frequency signal through the first antenna, and sending, by the first information processor of the electronic device, a first processing signal to the SoC chip through the first signal line, wherein the first processing signal comprises a radio frequency signal coupled on the first signal line;
generating, by the electronic device, a first reverse signal based on pre-stored first parameter information,
partially or completely eliminating, by the electronic device based on the first reverse signal, the radio frequency signal coupled on the first signal line in the first processing signal to obtain a second processing signal;
parsing, by the electronic device, the second processing signal to record a first quantity of error times that there is an error in parsing the second processing signal;
generating, by the electronic device, a second reverse signal based on pre-stored second parameter information;
partially or completely eliminating, by the electronic device based on the second reverse signal, the radio frequency signal coupled on the first signal line in the first processing signal, to obtain a third processing signal;
parsing, by the electronic device, the third processing signal to record a second quantity of error times that there is an error in parsing the third processing signal; and
determining, by the electronic device, a first optimal reverse signal based on the first quantity of error times and the second quantity of error times, wherein the first optimal reverse signal is used by the electronic device to partially or completely eliminate the radio frequency signal coupled on the first signal line when the radio frequency device and the first information processor work normally.

2. The method according to claim 1, wherein before the triggering, by the electronic device, the first device and the first antenna to be in the working state, the method further comprises:
detecting, by the electronic device, whether the electronic device satisfies a first condition;
wherein the first condition comprises: the electronic device receives a first instruction for triggering the electronic device to determine the first optimal reverse signal, the electronic device is subjected to violent vibration or shaking, or the electronic device is in a charging state.

3. The method according to claim 1, wherein the parsing, by the electronic device, the second processing signal to record the first quantity of error times that there is an error in parsing the second processing signal comprises:
recording, by the electronic device, a parsing state of the second processing signal at a specified frequency, wherein the parsing state of the second processing signal is used to indicate the electronic device to parse whether the second processing signal is correct; and
determining, by the electronic device, a total quantity of times of recording a parsing state that indicates that there is an error when the electronic device parses the second processing signal as the first quantity of error times.

4. The method according to claim 3, wherein the parsing, by the electronic device, the third processing signal to record the second quantity of error times that there is an error in parsing the third processing signal comprises:
recording, by the electronic device, a parsing state of the third processing signal at a specified frequency, wherein the parsing state of the third processing signal is used to indicate the electronic device to parse whether the third processing signal is correct; and
determining, by the electronic device, a total quantity of times of recording a parsing state that indicates that there is an error when the electronic device parses the third processing signal as the second quantity of error times.

5. The method according to claim 1, wherein the determining, by the electronic device, the first optimal reverse signal based on the first quantity of error times and the second quantity of error times comprises:
based on the first quantity of error times being less than the second quantity of error times, determining, by the electronic device, that the first reverse signal is the first optimal reverse signal; and
based on the first quantity of error times being greater than the second quantity of error times, determining, by the electronic device, that the second reverse signal is the first optimal reverse signal.

6. The method according to claim 1, wherein the first information processor further comprises a second device, the radio frequency device further comprises a second antenna, and the method further comprises:
triggering, by the electronic device, the second device and the second antenna to be in a working state;
transmitting, by the radio frequency device in the electronic device, a second radio frequency signal through the second antenna, and sending, by the first information processor of the electronic device, a fourth processing signal to the SoC chip through the first signal line, wherein the fourth processing signal comprises the radio frequency signal coupled on the first signal line, when the first antenna and the second antenna are the same, the first device and the second device are different, and when the first device and the second device are the same, the first antenna and the second antenna are different;
partially or completely eliminating, by the electronic device based on the first reverse signal, the radio frequency signal coupled on the first signal line in the fourth processing signal to obtain a fifth processing signal;
parsing, by the electronic device, the fifth processing signal to record a third quantity of error times that there is an error in parsing the fifth processing signal;
partially or completely eliminating, by the electronic device based on the second reverse signal, the radio frequency signal coupled on the first signal line in the fourth processing signal to obtain a sixth processing signal; and
parsing, by the electronic device, the sixth processing signal to record a fourth quantity of error times that there is an error in parsing the sixth processing signal;
wherein the determining, by the electronic device, the first optimal reverse signal based on the first quantity of error times and the second quantity of error times comprises:
determining, by the electronic device, the first optimal reverse signal based on the first quantity of error times, the second quantity of error times, the third quantity of error times, and the fourth quantity of error times.

7. The method according to claim 6, wherein the determining, by the electronic device, the first optimal reverse signal based on the first quantity of error times, the second quantity of error times, the third quantity of error times, and the fourth quantity of error times comprises:
based on a sum of the first quantity of error times and the third quantity of error times being less than a sum of the second quantity of error times and the fourth quantity of error times, determining, by the electronic device, that the first reverse signal is the first optimal reverse signal; or
based on a sum of the first quantity of error times and the third quantity of error times being greater than a sum of the second quantity of error times and the fourth quantity of error times, determining, by the electronic device, that the second reverse signal is the first optimal reverse signal.

8. The method according to claim 1, wherein the SoC chip and the first information processor are further connected through a second signal line, and the method further comprises:
obtaining, by the electronic device, a first difference value between an amplitude value of a radio frequency signal coupled on the second signal line and an amplitude value of a radio frequency signal coupled on the first signal line, and obtaining a second difference value between a phase of the radio frequency signal coupled on the second signal line and a phase of the radio frequency signal coupled on the first signal line; and
determining, by the electronic device, a second optimal reverse signal based on parameter information of the first optimal reverse signal, the first difference value, and the second difference value, wherein the second optimal reverse signal is used by the electronic device to partially or completely eliminate the radio frequency signal coupled on the second signal line when the radio frequency device and the first information processor work normally.

9. The method according to claim 1, wherein the SoC chip and the first information processor are further connected through a second signal line, and the first optimal reverse signal is further used by the electronic device to partially or completely eliminate a radio frequency signal coupled on the second signal line when the radio frequency device and the first information processor operate normally.

10. The method according to claim 8, wherein the determining, by the electronic device, the second optimal reverse signal based on the parameter information of the first optimal reverse signal, the first difference value, and the second difference value comprises:
superimposing, by the electronic device, an amplitude value of the first optimal reverse signal with the first difference value, to obtain an amplitude value of the second optimal reverse signal;
superimposing, by the electronic device, a phase of the first optimal reverse signal with the second difference value, to obtain a phase of the second optimal reverse signal;
determining, by the electronic device, waveform information of the second optimal reverse signal based on waveform information of the first optimal reverse signal, wherein waveform information of the second optimal reverse signal is the same as waveform information of the first optimal reverse signal; and
determining, by the electronic device, the second optimal reverse signal based on the amplitude value of the second optimal reverse signal, the phase of the second optimal reverse signal, and the waveform information of the second optimal reverse signal.

11. The method according to claim 1, wherein the first parameter information comprises first waveform information of the first reverse signal, a first amplitude value of the first reverse signal, and a first phase of the first reverse signal.

12. The method according to claim 11, wherein the second parameter information comprises second waveform information of the second reverse signal, a second amplitude value of the second reverse signal, and a second phase of the second reverse signal, the first waveform information and the second waveform information are the same, and the first phase and the second phase are different.

13. The method according to claim 1,
wherein the first information processor comprises one or more of the following: a display device, an audio device, or a camera device; and
wherein the radio frequency device comprises a radio frequency channel and a baseband processor modem.

14. The method according to claim 1, wherein the first signal line comprises:
a mobile industry processor interface (MIPI) signal line, or an inter-integrated circuit (I2C) bus, or a main system clock (MCLK) signal line, or a general purpose input/output (GPIO) signal line.

15. An electronic device, comprising:
one or more processors; and
one or more memories coupled to the one or more processors, wherein the electronic device comprises a system-on-chip (SoC) chip, a first information processor, and a radio frequency device, wherein the first information processor comprises a first device, the SoC chip and the first information processor are connected through a first signal line, and the radio frequency device comprises a first antenna, wherein the one or more memories are configured to store computer program code, the computer program code comprises computer instructions, and when the one or more processors execute the computer instructions, the electronic device is enabled to:
trigger the first device and the first antenna to be in a working state;
transmit, by the radio frequency device, a radio frequency signal through the first antenna, and send, by the first information processor, a first processing signal to the SoC chip through the first signal line, wherein the first processing signal comprises a radio frequency signal coupled on the first signal line;
generate a first reverse signal based on pre-stored first parameter information,
partially or completely eliminate, based on the first reverse signal, the radio frequency signal coupled on the first signal line in the first processing signal to obtain a second processing signal;
parse the second processing signal to record a first quantity of error times that there is an error in parsing the second processing signal;
generate a second reverse signal based on pre-stored second parameter information:
partially or completely eliminate, based on the second reverse signal, the radio frequency signal coupled on the first signal line in the first processing signal, to obtain a third processing signal:
parse the third processing signal to record a second quantity of error times that there is an error in parsing the third processing signal; and
determine a first optimal reverse signal based on the first quantity of error times and the second quantity of error times, wherein the first optimal reverse signal is used by the electronic device to partially or completely eliminate the radio frequency signal coupled on the first signal line when the radio frequency device and the first information processor work normally.

16. An electronic device, comprising:
a system-on-chip (SoC) chip;
a first information processor;
a radio frequency device, wherein the first information processor comprises a first device, the SoC chip and the first information processor are connected through a first signal line, and the radio frequency device comprises a first antenna; and
a chip configured to trigger the first device and the first antenna to be in a working state;
wherein the radio frequency device is configured to transmit a radio frequency signal through the first antenna;
wherein the first information processor is configured to send a first processing signal to the SoC chip through the first signal line, wherein the first processing signal comprises a radio frequency signal coupled on the first signal line; and
wherein the chip is further configured to:
generate a first reverse signal based on pre-stored first parameter information,
partially or completely eliminate, based on the first reverse signal, the radio frequency signal coupled on the first signal line in the first processing signal to obtain a second processing signal;
parse the second processing signal to record a first quantity of error times that there is an error in parsing the second processing signal;
generate a second reverse signal based on pre-stored second parameter information;
partially or completely eliminate, based on the second reverse signal, the radio frequency signal coupled on the first signal line in the first processing signal, to obtain a third processing signal;
parse the third processing signal to record a second quantity of error times that there is an error in parsing the third processing signal; and
determine a first optimal reverse signal based on the first quantity of error times and the second quantity of error times, wherein the first optimal reverse signal is used by the electronic device to partially or completely eliminate the radio frequency signal coupled on the first signal line when the radio frequency device and the first information processor work normally.

* * * * *